United States Patent [19]

Saito et al.

[11] Patent Number: 4,866,692

[45] Date of Patent: Sep. 12, 1989

[54] METHOD AND APPARATUS FOR INFORMATION RECORDING AND REPRODUCTION OF A PIT-SHAPE-FORMING OPTICAL RECORDING TYPE

[75] Inventors: Atsushi Saito, Ichikawa; Takeshi Maeda; Hisataka Sugiyama, both of Kokubunji; Wasao Takasugi, Higashiyamato, all of Japan

[73] Assignee: Hitachi, Ltd., Tokyo, Japan

[21] Appl. No.: 85,964

[22] Filed: Aug. 17, 1987

[30] Foreign Application Priority Data

Aug. 22, 1986 [JP] Japan .................................. 61-195376

[51] Int. Cl.$^4$ ............................................. G11B 7/007
[52] U.S. Cl. ....................................... 369/59; 369/111; 369/50; 369/51; 369/47; 369/48; 369/106; 369/116; 369/54
[58] Field of Search .................. 360/45; 369/124, 111, 369/50, 51, 47, 48, 106, 116, 54, 59; 358/342, 337, 339; 346/76 L, 108

[56] References Cited

U.S. PATENT DOCUMENTS

| | | | |
|---|---|---|---|
| 4,157,568 | 6/1979 | Ohki et al. ......................... | 369/116 |
| 4,488,277 | 12/1984 | McFarlane et al. .................. | 369/48 |
| 4,549,288 | 10/1985 | Chan ..................................... | 369/59 |
| 4,558,441 | 12/1985 | Yokoto et al. ........................ | 369/59 |
| 4,562,567 | 12/1985 | Frankfort et al. ................... | 369/116 |
| 4,646,103 | 12/1985 | Sugiyama et al. ..................... | 369/54 |
| 4,734,900 | 3/1988 | Davie ..................................... | 369/59 |
| 4,748,611 | 5/1988 | Tsuyoshi ............................... | 369/59 |

OTHER PUBLICATIONS

"Introduction to Video Disk and DAD" by Iwamura, Corona Publishing Co., pp. 212-215.

Primary Examiner—Vincent P. Canney
Assistant Examiner—Kevin Fournier
Attorney, Agent, or Firm—Antonelli, Terry & Wands

[57] ABSTRACT

A method and an apparatus for recording and reproducing information for use with an optical disk apparatus in which a pit edge recording method is used. According to the pit edge recording method, the leading edge and the trailing edge of a hole pit or a record domain generated during a recording operation are dealt with as information. During the recording, the recording pulse width and the recording power are corrected, and during the reproduction, the variation in the edge position is corrected.

18 Claims, 19 Drawing Sheets

FIG. 2
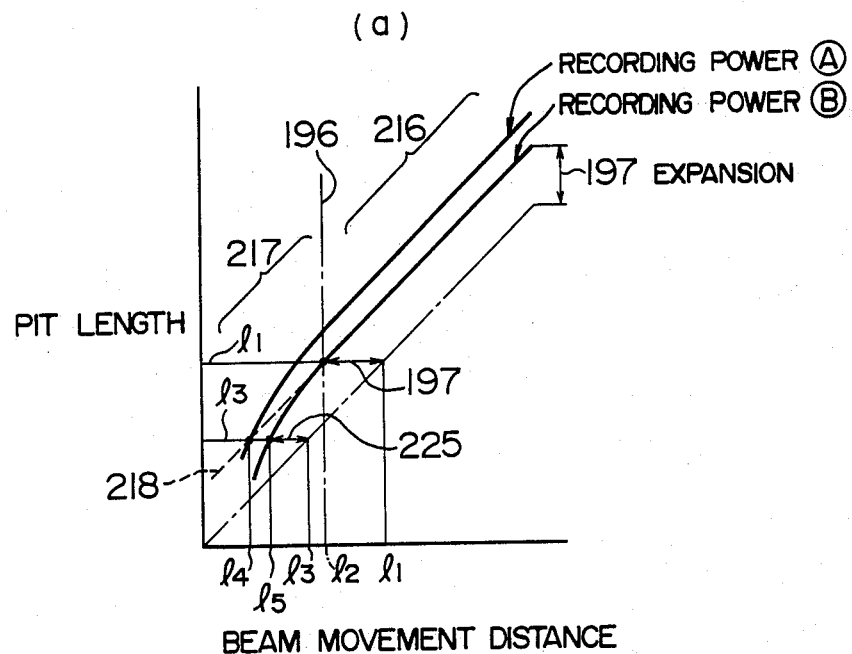
(a)
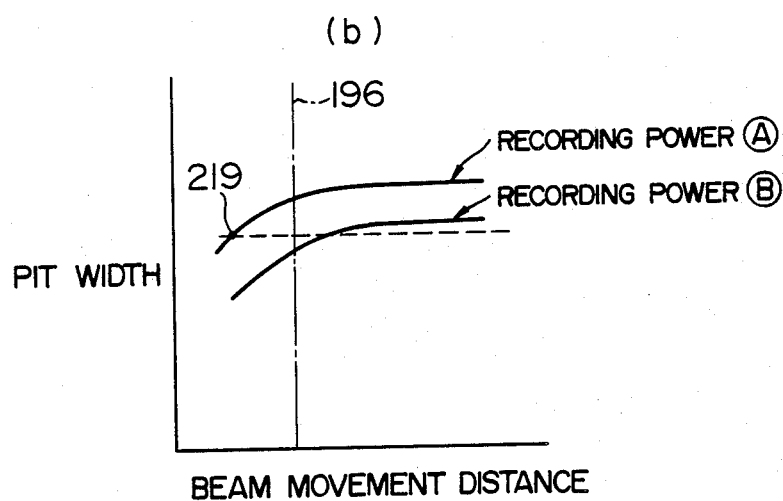
(b)

FIG. 3
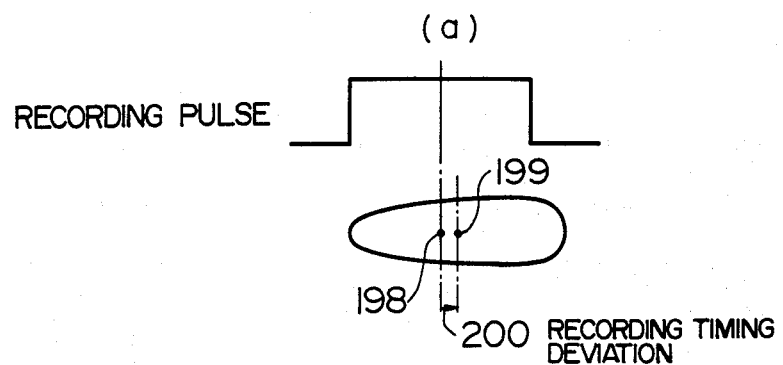
(a)
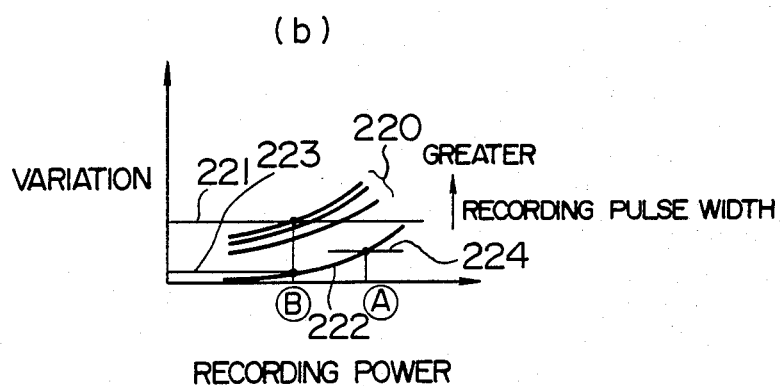
(b)
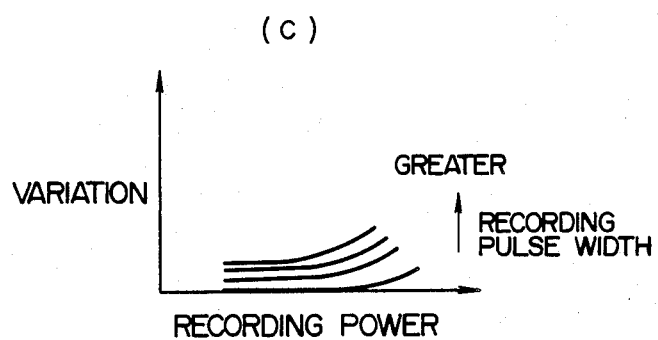
(c)

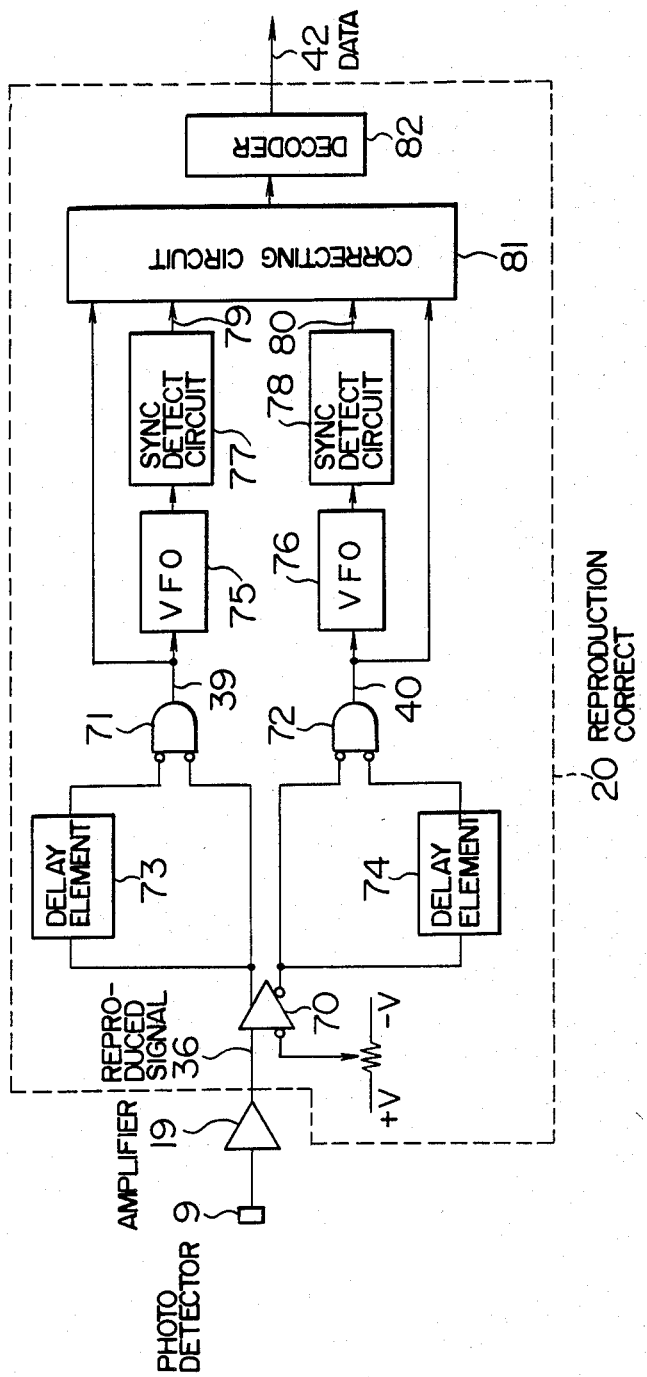
F I G. 15

METHOD AND APPARATUS FOR INFORMATION RECORDING AND REPRODUCTION OF A PIT-SHAPE-FORMING OPTICAL RECORDING TYPE

CROSS-REFERENCE OF THE RELATED APPLICATION

This application relates to an application U.S. Ser. No. 878,436 entitled "Method and Apparatus for Recording and Reproducing Information" and assigned to the present assignee, based an Japanese Patent Application No. 60-144751 filed July 3, 1985.

BACKGROUND OF THE INVENTION

The present invention relates to a method of recording and reproducing information and an apparatus for recording and reproducing information on and from an optical disk, and in particular, to a method of recording and reproducing information and an apparatus for recording and reproducing information on and from an optical disk using a pit edge recording method suitable for improving a recording density.

A method of demodulation for demodulating recording data by detecting a leading edge and a trailing edge of a change in a quantity of a reflected light (i.e. a waveform of a reproduced signal) obtained from an optical disk has been adopted for a digital audio disk (DAD). The principle of the data demodulation is described e.g. in "Introduction to Video Disk and DAD" by Iwamura (Corona Publishing Co. Japan), pp. 212–215. The demodulation is achieved by detecting variation points in the waveform of the reproduction signal, namely, the leading edge and the trailing edge thereof and producing a detection window from the leading edge and the trailing edge so as to attain reproduced data. According to the demodulation method used for the DAD, a correct demodulation is conducted under the conditions that assuming a data interval to be T, the detection window width is T/2 and the pulse representing variation points are located in a region of ±T/4. Consequently, an error occurs if a zero cross point (corresponding to a variation point) is moved due to a noise, a waveform distortion, a rotation jitter, an eccentric jitter, etc. to be beyond the detection window. Although the leading edge and the trailing edge can be used as data in an optical disk of a write-once type, since an object disk for the recording and reproducing operations is directly irradiated with laser light pulses to effect a thermal recording thereon in a case of the write-once type disk, the positions of the leading edge and the trailing edge of a recording region (a pit or a magnetic domain) are likely to be easily influenced by a sensitivity characteristic of a recording medium and a jitter consequently, the positions are apt to be indefinitely shifted. In the case of the DAD, since the pits are manufactured in a photoresist forming process when the disk is produced, such a problem has not arisen.

When applying the pit edge recording system to an optical disk of the write-once type or an erasable type, it is essential to correct the edge shift of the leading edge and the trailing edge in any cases during a recording operation.

SUMMARY OF THE INVENTION

According to the types of the disk above like the DAD, the information pits are beforehand produced when the disk is manufactured, and hence the amount of edge shift hardly causes a problem and the stable demodulation can be achieved. However, for recording medium such as an optical disk of the write-once type, a magneto-optical disk, an optical disk of phase-transition type in which a recording pit is directly formed in a recording film of an object disk with a thermal energy of a beam spot, the pit edge recording method using the edges as data has not been put to practical uses. This is because the pits formed are apt to be influenced by the sensitivity characteristic of a recording medium, a linear speed thereof, and the like. Since the pit formed by a thermal recording operation has an expanded area due to an influence of a heat diffusion, the positions of the edges thereof cannot be easily controlled.

It is therefore an object of the present invention to provide a method and an apparatus for recording and reproducing information in which in a recording and reproducing method using as data the leading-edge and the trailing edge of a recording pit, the variation in the recording characteristic is minimized to enable highly reliable data recording and reproducing operations with a reduced edge shift and a pit edge recording advantageous for a high-density recording can be effected with a stability also on a medium of the thermal recording type.

According to the present invention, in order to properly control the edge positions, the recording pulse width and power are continuously optimized with respect to the characteristic of the recording medium and the recording position The medium itself is desired to have a linear characteristic or the like for the variation of a reproduction pulse width with respect to the recording pulse width. In addition, the variation in the edge position not removable during the recording operation is to be eliminated during the reproduction.

In an operation to effect a correction during a recording operation, for the object position on a disk, information beforehand generated and stored in a header thereof or information detected by use of an external scale is used. Alternatively, both of the information items may be used. Moreover, if a type, a sensitivity characteristic, and the like are beforehand recorded in the header section, the correction can be achieved with an improved accuracy This enables the recording pulse width and power to be easily and properly set. In a correction for a reproducing operation, when recording user data on a disk, a duplicated synchronization signal is simultaneously recorded preceding the user data. A time difference between a detection signal attained from a series of leading edge data of the synchronization signal and a detection signal obtained from a series of trailing edge data is detected to effect a time-axis correction on user data in the succeeding sector, which reduces influences from the edge variation and the unevenness of reflection not removable only through the correction in the recording operation. As described above, the amount of edge movement is corrected during the recording and the quantity of variation in the edge position is corrected during the reproduction, thereby enabling stable recording and reproduction of information.

Incidentally, in U.S. Pat. No. 4,646,103, there has been described a system in which the pit edge recording method is applied to a recording medium of the thermal recording type.

According to U.S. Pat. No. 4,646,103, for a recording pulse with a long pulse width having a strong influence of the heat diffusion, in order to prevent the effect of the heat diffusion with respect to a portion of a pit or a magnetic domain ranging from the leading edge to the trailing edge thereof, the recording pulse signal includes two pulses each having a short pulse width and respectively representing the leading edge and the trailing edge of a demodulation signal pulse.

When the interval between these two pits or magnetic domains (i.e. a spatial interval associated with the time interval between the recording pulses) is less than an optical resolution of the light beam for the reproduction, a hollow of a reproduced waveform corresponding to the interval between two pits or magnetic domains is at a level higher than a slice level. Namely, in this case, the two pits or magnetic domains are reproduced as a consecutive pit or magnetic domain When the interval between these two pits or magnetic domains is not less than the optical resolution of the light beam for the reproduction, between two recording pulses, there is supplied a laser output with a magnitude not giving an influence of the heat diffusion to the trailing edge of the succeeding pit thereof or there is inserted at least a pulse having a short pulse width. The interval of the inserted pulses are so controlled that the interval between the pits or magnetic domains formed by these pulses is less than the optical resolution of the reproducing light beam. This provision causes the hollow of the reproduced waveform corresponding to the interval between the pits or the magnetic domains to be retained at a level higher than the slice level and hence a plurality of pits or magnetic domains can be reproduced as a successive pit or a successive magnetic domain. Incidentally, during the reproduction, the signals associated with the leading edge and the trailing edge of recording information are respectively detected in an independent fashion so that the timing signal is independently reproduced respectively from each of the obtained signals and the data reproduction is effected according to the timing signals.

BRIEF DESCRIPTION OF THE DRAWINGS

The present invention will be apparent from the following detailed description taken in conjunction with the accompanying drawings in which:

FIG. 2 is a schematic diagram illustrating relationships between pits formed and the distance of beam movement;

FIG. 3 is a schematic diagram illustrating relationships between the recording power and the quantity of variation in the recording timing;

FIG. 15 is a schematic circuit diagram showing an example of the configuration of a reproduction correction circuit;

DESCRIPTION OF THE PREFERRED EMBODIMENTS

According to the present invention, a pit edge recording method using as data the leading edge and the trailing edge of a recording pit is applied to a recording medium of the thermal recording type. The present invention can also be used for a write-once type disk, a phase-transition type disk, and a magneto-optical disk.

In a thermal recording operation, the light energy absorbed when a light is irradiated into a recording film is transformed into a thermal energy, which develops a temperature distribution reflecting the influence of the heat diffusion strongly and mainly depending on the thermal conductivity of the recording medium. As a result, a pit is formed corresponding to the temperature distribution. In such a recording process, the effect of the heat diffusion greatly contributes to the shape of the pit. The phenomenon will be described.

Figure 1:
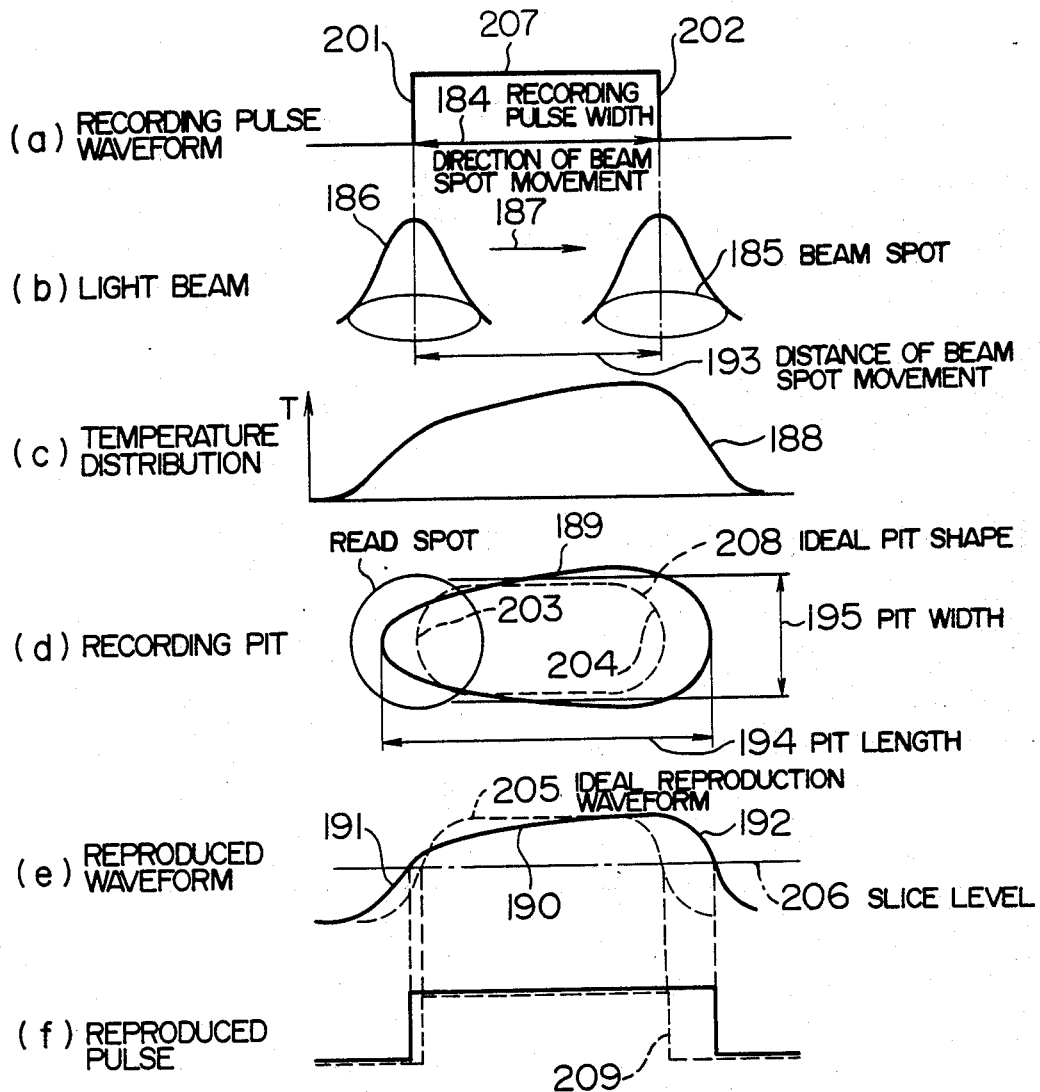
FIG. 1 (a-f) is an explanatory diagram useful for explaining the pit edge recording method.

In FIG. 1, when a light irradiation is achieved with a recording pulse 207 having a pulse width 184 as shown in (a), the surface of a disk is scanned by a beam spot 185 which has an irradiation energy 186 of the Gaussian distribution and a finite diameter as shown in (b); consequently, a heat diffusion takes place in the direction of the beam spot movement 187. As a consequence, the temperature distribution 188 developed on the disk or the shape of the corresponding pit 189 formed therein becomes to be asymmetric, namely, extends toward the end of the pit as shown in (c) and (d). In a reproduced waveform 190 attained correspondingly thereto, as shown in (e), the gradient and the amplitude respectively vary between a leading edge 191 and a trailing edge 192.

Next, relationship between the expansion of the pit 189 due to the influence of the heat diffusion and the beam movement distance corresponding to the recording pulse width are shown in FIG. 2. In (a) and (b), the relationships are plotted for two different recording power values (A) and (B) (A>B) at a given linear speed, where the abscissa indicates the distance of beam movement 193. In (a), the ordinate represents the length of the pit 189 in the direction of beam spot movement 187, namely, the pit length 194; whereas, the ordinate of (b) indicates the average width of the pit in a direction orthogonal to the beam spot movement direction 187, namely, the pit width 195 shows in (d) of FIG. 1. As can be seen from these graphs, the fashion of expansion of the pit 189 formed varies between two regions separated by a dot-and-dash line 196. That is, when the recording power is fixed, in a region 216 where the beam movement distance 193 is greater than that of a boundary 196, the pit length is attended with a fixed amount of expansion 197 in a linear relationship not depending on the beam movement distance. Furthermore, the pit width 195 also has a characteristic to reach a fixed saturation value. The amount of expansion increase as the recording power becomes stronger and decreases as the linear speed is increased. On the other hand, in a region where the beam movement distance 197 does not exceed that of the boundary 196, both of the pit length and the bit width develop a nonlinear relationship. A qualitative interpretation of the characteristics above will be now described. When the light spot 185 scans the surface of a disk, in a region where the beam movement distance is less than the distance of the boundary 196, the effect of the expansion and accumulation of thermal energy due to the heat diffusion towards the end of pit causes the expansion of the pit to be nonlinearly increased as the beam movement distance becomes longer. However, when the distance of the beam movement exceeds that of the boundary 196, since the accumulation of the thermal energy becomes to be stationary, the bit length has a linear expansion amount and the bit width is fixed. Consequently, since the expansion of the thermal energy is increased as the thermal conductivity of the recording medium becomes higher, the distance of the beam movement where the accumulation of the thermal energy is stationary, namely, the boundary 196 is shifted toward a side of the longer distance. For the change in the recording conditions, since the influence of the heat diffusion is emphasized as the recording power is increased or the linear speed is decreased, the boundary 196 also shifts toward the longer-distance side. The characteristics are shown in graphs (a)–(c) of FIG. 3 in which the definition of measured quantity is represented. Assuming the difference between a center position 199 of a pit formed and a center position 198 of the recording pulse irradiated on the disk surface to be a recording timing variation 200, the relationships between the amount of the variation 200 and the recording power are obtained by use of the beam movement distance as a parameter as shown in (b)–(c). The linear speed varies between the graphs of (b) and (c), namely, the linear speed of (c) is less than that of (b). The plotted results of (b) and (c) correspond to the characteristics shown in FIG. 2. In the region of the linear relationship, the variation is fixed under conditions that the recording power and the linear speed are fixed. On the other hand, in the region of the nonlinear relationship, it can be seen from the graphs that the variation or deviation increases as the distance of the beam movement becomes longer. Two main characteristics are apparent. First, under the condition of the constant recording power and the fixed linear speed, with respect to the variation in the recording timing, the expansion of the pit hardly changes on the side of the leading edge thereof and only the expansion on the side of the trailing edge thereof varies depending on the distance of the beam movement, which is shown in the characteristic of (b) or (c) of FIG. 3. Secondly, the increase of the variation due to the strengthened recording power is caused because the degree of the expansion of the pit on the trailing edge side is greater than that of the expansion on the leading edge side. These two characteristics are associated with a fact that the influence of the heat diffusion to the rear side of the pit strongly contributes to the formation of the pit.

Based on the results attained from FIGS. 1–3, a description will be given of problems in a case where the pit edge recording method is applied to the thermal recording.

In forming an ideal pit when applying the pit edge recording method to the thermal recording, the pit is desirably formed in a pit shape 208 indicated by a dotted line in (d) of FIG. 1. Namely, when the positions on a disk respectively corresponding to a leading edge 201 and a trailing edge of 202 of a recording pulse 207 of (a) of FIG. 1 match with a leading edge 203 and a trailing edge 204 of a pit formed and the width of the pit is the same at the leading edge 203 and the trailing edge 204 of the pit, an ideal reproduction waveform 205 ((e) of FIG. 1) is attained and a reproduction pulse 209 ((f) of FIG. 1) detected at an intersection of the waveform 205 and a slice level 206 set to a half value of the amplitude of the reproduced waveform matches with the recording pulse 207 ((a) of FIG. 1). Moreover, in a case where a system with modulability including as a series of data a series of pulses having the different recording pulse widths, it is necessary to control the pit width not to be varied depending on the recording pulse widths. Otherwise, detection of the leading edge and the trailing edge of the pit series becomes to be difficult.

Application of the pit edge recording method to a thermal-recording medium is attended with the following problems.

(1) As shown in FIG. 1, since the amplitude of the reproduced waveform 190 obtained from an asymmetric pit 189 varies between the leading edge 191 and the trailing edge 192 thereof, when detecting an edge at an intersection between the waveform and the fixed slice level 206, either the leading edge of the trailing edge of the pit does not match with the leading edge or the trailing edge of the reproduced pulse, which causes a jitter.

Figure 4:
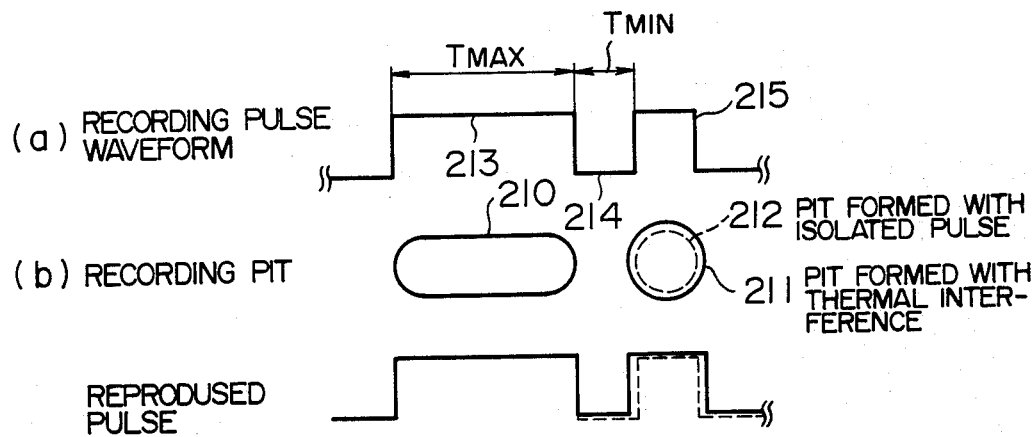
FIG. 4 is an explanatory diagram useful for explaining the influence of the heat diffusion.

(2) As shown in FIG. 4, when effecting a recording by use of a series of successive recording pulses like those of (a), since the thermal energy used to record a preceding pit 210 like in a case of (b) is transferred to a position where the succeeding pit 211 is to be recorded because of an effect of the heat diffusion, the position is preheated and hence a pit 211 thus formed has an area greater than that of a pit 212 (indicated by a dotted line) recorded with a singular recording pulse, which causes a problem called the thermal interference leading to the jitter.

(3) As shown in (a) of FIG. 1, the pit length is in general greater than the distance of the beam movement and hence the associated reproduction pulse width becomes longer than the recording pulse width. Particularly, in a case where the system with modulability is used to increase the recording density by decreasing the interval between the data series as the beam movement distance corresponding to the recording pulse width of the data series is included more deeply in the nonlinear region, since the degree of the expansions in the direction of the length and in the direction of the width respectively vary depending on the distance of the beam movement, it is difficult to conduct the ideal pit formation described above in consideration of the variation in recording timing 200 shown in (a) of FIG. 3.

For these three problems above, a concrete method to be applied to the recording and the reproduction and a recording medium suitable for the pit edge recording have been considered not to be easily found out and a definite scheme has not been developed.

In order to apply the pit edge recording method to a thermal recording medium, the three problems must be first solved. To this end, according to the present invention, a recording medium has been selected and an optimization is effected on a correction method during a recording operation.

First of all, a recording film having a low thermal conductivity has been selected to remove the first and second problems. However, when the thermal conductivity becomes to be too small, the effective recording sensitivity is increased and hence the recording film is deformed due to the irradiation light power during a data read operation. Consequently, the optimal thermal conductivity is selected to be as great as possible without causing the first and second problems. The upper limit of the thermal conductivity not leading to the first problem of the asymmetric shape of a pit is restricted by a condition that the difference between the amplitude levels respectively of the leading edge 191 and the trailing edge 192 of the reproduced signal is small. Namely, the upper limit is selected so as to fully reduce the difference between the width of the leading edge of the pit and that of the trailing edge of the pit with respect to the diameter of the beam spot (1/10 or less). On the other hand, the upper limit of the thermal conductivity not leading to the third problem of the influence of the thermal interference is restricted by the recording condition under which the influence of the thermal interference becomes to be maximized. That is, the maximum value is selected such that as shown in (a) of FIG. 4, in a case where after the recording pulse 213 corresponding to the maximum data interval $T_{MAX}$ of the code with modulability utilized, the next recording pulse 215 is supplied with an interval of a period of time 214 equal to the minimum data interval $T_{MIN}$, the shape of the pit 211 is not different from that of the pit 212 formed with an isolated pulse.

Utilization of a recording medium satisfying the conditions of the thermal conductivity can solve the first and third problems. However, the second problem cannot be removed. To overcome this difficulty, the following recording correction method i used.

The correction must be effected in consideration of such conditions as the sensitivity of the recording film, the recording radius or the linear speed, the density of a data pattern to be recorded, and the like.

In a case where the linear speed and the recording power are determined in the linear region 216 in (a) of FIG. 2, when the value obtained by subtracting an expansion time converted from a fixed expansion 197 from an object pulse width is used as a recording pulse width, a reproduced waveform associated with the object pit length, namely, the pulse width can be detected. Next, a description will be given of an operation to set an optimal recording power at a given linear speed. First, in a case of a disk rotating at a constant rotary speed, the linear speed corresponds to a recording position. A method for recognizing the recording position will be described.

A disk includes information called a header portion in which track numbers, sector numbers, and the like are stored beforehand. When achieving a recording operation, the beam spot is first moved to a position over a track and a sector in which data is to be written. That is, the track number is recognized in any cases and hence the present position of the beam spot can be known from the track number. If an external scale value can be used as means to identify position of the optical head, the beam spot is obtainable in the similar fashion.

Recognition of the recording position above enables to optimize the recording power.

The optimization of the recording power is achievable by satisfying the following three conditions for a given linear speed shown in (a)-(b) of FIG. 2, namely, the characteristic developed at the recording position obtained according to the method described above. First, the recording power must not be set to a large value which may cause the time of expansion to exceed the interval of the used data with modulability. Secondly, the recording power should be used in a region where the variation in the pit length is as small as possible with respect to the change in the recording power A great fluctuation of the pit length leads to a jitter associated with the deviation of the recording power. In the thermal recording, since there exists a threshold value for the thermal recording in general, an unstable recording results when the recording power is too small; consequently, the recording power must be increased to some extent.

Thirdly, the recording power should be so set not to cause the pit width to be excessively great. As shown in (b) of FIG. 2, when the recording power is increased, the pit width becomes greater. Consequently, in a case where pits are recorded in adjacent tracks in the radial direction of a disk and are then reproduced, an influence of signals extracted from pits in the adjacent track, namely, an effect of so-called cross-talk noise cannot be ignored. The upper limit of the allowable pit width is about W/2 when the track pitch is about the diameter W of the beam spot.

Next, a description will be given of means for correcting the recording pulse width. The recording pulse width can be reduced by effecting a computation of a logical OR operation between a data pattern itself and a pattern obtained by delaying the data pattern. This provision enables the length of the pit actually recorded in the disk to be associated with the reproduction pulse width to be determined.

In the linear region 216, since the recording timing deviation 200 does not depend on the recording pulse width and takes a fixed value, a series of reproduced pulses corresponding to a series of data with modulability can be attained by use of the correction means.

However, in the nonlinear region 217 of (a) of FIG. 2, since the expansion varies depending on the recording pulse width, namely, the distance of the beam movement, in a case where the data interval of the series of data with modulability is included in the nonlinear region, even when a value obtained by subtracting an expansion time converted from a fixed expansion 197 in the linear region from the data interval is used as the recording pulse width, the object pit length cannot be recorded; furthermore, the pit width cannot be set to a fixed value. Consequently, a pattern of data with modulability cannot be properly reproduced.

Next, a first method of recording correction in which the recording power is controlled depending on a data pattern will be described. According to this method, when a data pattern associated with pit length included in the nonlinear region 217 is to be recorded, the recording power is controlled depending on the interval of the data patterns so as to locate the plotted data along a dotted line 218 which is an extension of the linear characteristic. For example, for the recording power (B), when recording a data pattern associated with a pit length $l_1$ included in the linear region, a length $l_2$ is calculated by subtracting the expansion 197 from the beam movement distance $l_1$ to effect a correction of the linear region and then a recording pulse corresponding to the $l_2$ is irradiated. On the other hand, when recording a data pattern corresponding to a pit length $l_3$ included in the nonlinear region, the recording power is set to the value of (A) which is greater than the power (B). As a result, the linear characteristic 218 is developed for the recording power (B), namely, it is only necessary to irradiate a recording pulse corresponding to a length $l_4$ attained by subtracting the expansion 197 for the linear region from the beam movement distance $l_3$.

As described above, the correction of the expansion time equal to that applied to the linear region enables to record a pit with a pit length corresponding each data interval of the pattern of the data with modulability; moreover, since the pit width is also increased up to the level of the dotted line 219 as shown in (b) of FIG. 2, the object data pattern can be reproduced.

Moreover, as shown in (b) of FIG. 3, the variation 221 in the case 220 where the recording pulse width is in the linear region hardly depends on the recording pulse width and takes a fixed value; whereas the deviation 223 for the recording pulse width 222 in the nonlinear region greatly depends on the recording pulse width and takes a value considerably different from the value of the variation 221. Under these circumstances, according to the first correction method of the present invention, in the recording associated with the nonlinear region, the recording power is set to the value (A) greater than the recording power (B) for the linear region; consequently, the deviation or variation 224 effectively becomes to be similar to the deviation 221 associated with the recording in the linear region. Since the timing deviation during the reproduction is not caused if a fixed recording timing deviation takes place depending on the recording data pattern, the first correction method of the present invention can minimize the jitter due to the recording timing deviation.

Subsequently, a description will be given of a second correction method in which the recording pulse width is controlled depending on the data pattern. In (a) of FIG. 2, the correction in the linear region of the recording power (B) is achieved in the same fashion as for the first correction method. On the other hand, for example, when recording a data pattern corresponding to the bit length $l_3$ included in the nonlinear region, a beam movement distance $l_5$ is obtained by subtracting an expansion 225 less than the expansion 197 from the length $l_3$ and then a recording pulse corresponding to the resultant $l_5$ is irradiated on to the disk surface, thereby recording a pit having an object pit length $l_3$ as shown in FIG. 2 and reproducing the object data interval. In this situation, since the expansion in the nonlinear region varies depending on the beam movement distance, namely, the recording pulse width, the expansion 225 as the subtrahend in the subtraction above must be controlled depending on the data interval. Furthermore, in (b) of FIG. 2, when the recording pulse width is controlled according to the data pattern during the recording operation in consideration of the variation in the recording timing associated with the recording pulse width, a data pattern not including a jitter can be reproduced.

The operation to set a recording power depending on the density of the recording pattern as described above can be achieved by means of a pattern length judgment circuit using a counter.

Utilization of the recording correction above enables to correct the elongation of the pit length in the thermal recording, namely, the amount of the edge movement. However, the positional fluctuation of the edge itself due to the nonuniformity of sensitivity of the recording film and the variation in the recording power must be eliminated during the reproduction. If the position of the edge cannot be properly detected, the obtained signal becomes to be beyond the data discriminating window and hence an error is caused.

According to the present invention, in order to effect a correction during the reproduction, the double-pattern system is adopted for a start timing mark generally called a SYNC mark) indicating a position (timing) to start demodulating information corresponding to the leading and trailing edges of the reproduced waveform. A start timing mark disposed before a series of user data during a data recording operation is detected as a 1-pulse detection signal by use of detect means associated with the signal. The reason for the adoption of the double-pattern system is that the detention pulse from the leading edge and that from the trailing edge are separately attained to determine the time difference therebetween. For an ideal recording medium, the reproduced waveform should be similar to the waveform associated with the optical pulse used during the recording operation. Actually, however, as described above, because of the nonuniformity of the temperature distribution in the recording film due to the heat diffusion, the fluctuation in the write sensitivity, and the like, even after the optical pulse irradiation is finished, a pit is formed with an asymmetric shape with a trail. As a result, the gradient of the corresponding reproduction waveform varies between the leading edge and the trailing edge thereof. However, it has been confirmed from the consideration of the influence of the heat diffusion described above and results of experiments that the gradient is substantially in good agreement between the leading edges and between the trailing edges, respectively. Consequently, if the edge shift is once corrected depending on the time difference of the detection signals of the respective start timing signals, the same correction may be applied to the subsequent data series. For a recording medium controlled in sector units, the reliability can be further improved by effecting the correction in a sector-by-sector fashion. Incidentally, the method for correcting the amount of edge shift during the reproduction based on a provision to record the same pattern for the leading edge and the trailing edge of a pit has been proposed in U.S. Ser. No. 878,436.

Figure 5:
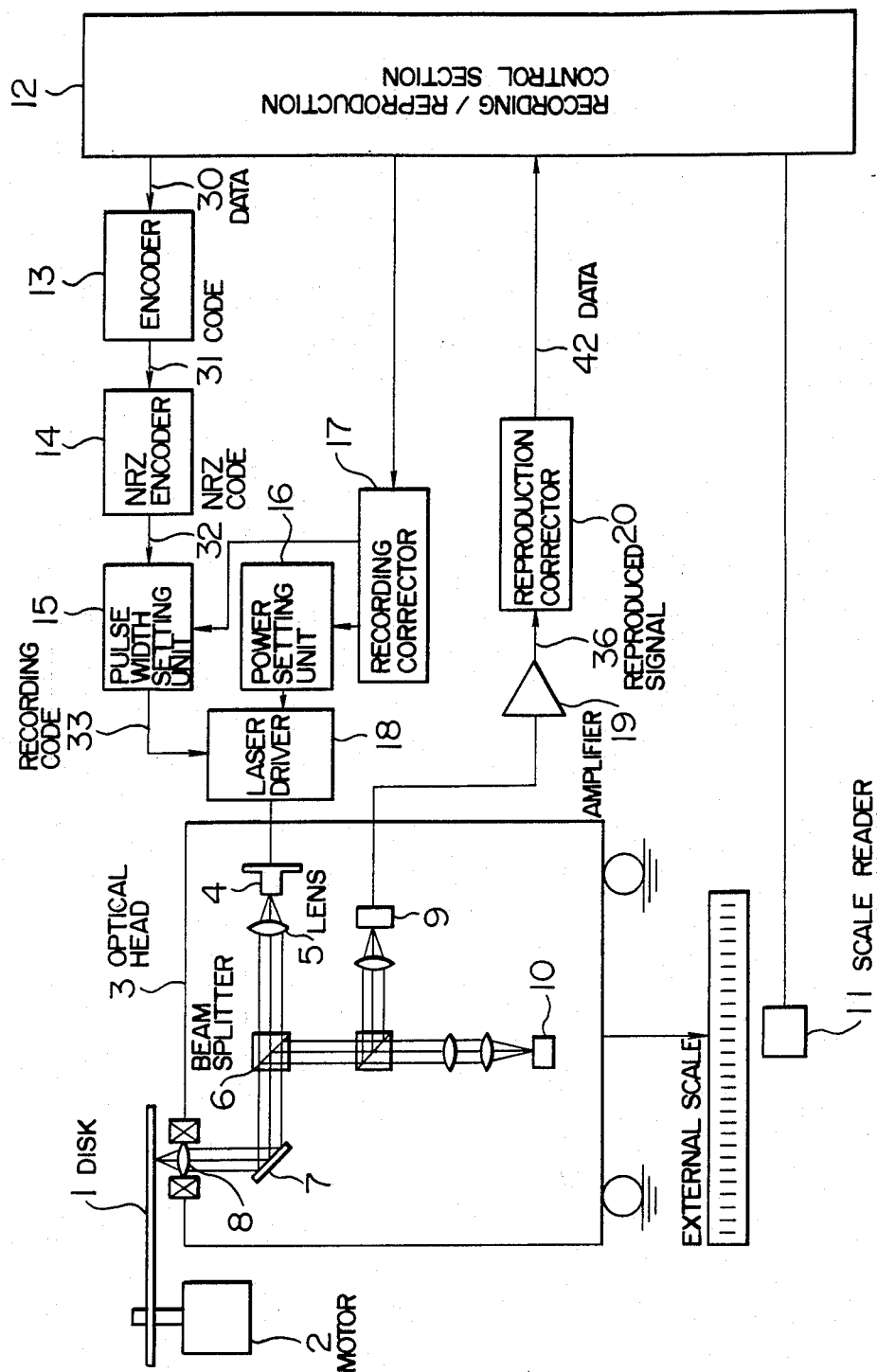
FIG. 5 is a schematic diagram illustrating the fundamental configuration of an optical disk apparatus to which the present invention is applied.

Referring now to FIG. 5, an embodiment of the present invention will be described. In the configuration of FIG. 1, a disk 1 is to be rotated by means of a motor 2. According to the present invention, the disk 1 may be rotated in a constant line speed system in which the rotary speed is varied depending on a radius associated with a position of the disk 1 where an optical head 3 is located or in a constant angular speed system in which the rotary speed is fixed regardless of the position of the optical head 3. The optical head 3 can be moved to a position over an object track of the disk 1. The light emitted from a semiconductor laser 4 is passed through a collimate lens 5 to be parallel light flux. The light is then fed through a beam splitter 6 and a galvano-mirror 7 to a focus lens 8, which in turn focuses the parallel light flux onto the disk 1. A light reflected on the disk 1 is fed through the focus lens 8 and the galvano-mirror 7 to the beam splitter 6, which reflects the light. Thereafter, the resultant light is delivered to an auto focusing photodetector 10. When rotating, the disk 1 vibrates in the vertical and horizontal or radial directions. For the vertical vibration, a servo signal from the auto focusing photodetector 10 is used to cause the focus lens 8 to follow the vibration of the disk 1, thereby retaining the focus on the disk 1. For the vibration in the radial direction, a servo signal from the tracking photodetector 9 is used so as to cause the overall optical head 3 to follow a vibration with a large amplitude and to change an angle of the galvano-mirror 7 for a vibration with a small amplitude, thereby locating the optical head 3 over a target track in any cases. The auto-focusing and the tracking described above can be achieved by use of the conventional servo system and are not directly related to the present invention; consequently, a detailed description thereof will be omitted.

Figure 6:
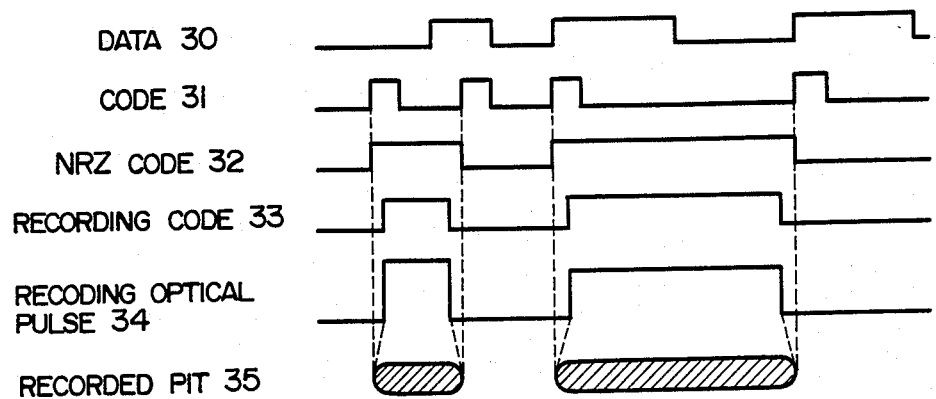
FIG. 6 is a schematic diagram illustrating a data recording method.

Prior to an explanation of the recording and reproduction, the pit edge recording method adopted as a recording method of the present invention will be described. FIG. 6 is a schematic diagram showing a case where data is modulated (encoded) to obtain codes, which are then recorded on a disk; whereas FIG. 7 is a schematic diagram illustrating a case where information recorded on a disk is reproduced to demodulate (decode) the original data.

In the diagram of FIG. 6, data 30 to be recorded is modulated to attain codes 31 by means of an encoder 13. The encode operation may be accomplished in any modulation method. Representative codes with modulability include an FM code, an MFM code, and a run-length limit (RLL) code such as a 2-7 code, an 8-10 code, or a 1-7 code. FIG. 6 shows, as an example, a case of the 2-7 code system. The codes 31 are processed by an NRZ encoder 14 to be nonreturn-to-zero (NRZ) codes 32. When the NRZ codes are directly recorded on a recording film of the disk 1, a pit thus formed generally has a length greater than the width of the recording light irradiated onto the disk 1. This phenomenon is determined by a balance between a degree of transfer through the recording film of the thermal energy absorbed therein and a melting point resulted from a composition of the recording film and a composition of a base film on which the recording film is disposed and further by a condition of the heat diffusion and the like. In the actual cases, these conditions must be examined through experiments. As an example, for a write-once type optical disk including a recording film made of PbTeSe, when a recording is conducted under conditions of a rotary speed of 1800 rotations per minute (rpm), a recording radius of 70 mm, and a recording power of 8.5 mW, a width of the actually reproduced recording pulse width of 100 ns is 145 ns, namely, an elongation of the pit length is 45 ns in terms of the period of time. As a consequence, in order to correspond the length of the recorded pit 35 formed to that of the NRZ codes 32, the pulse width of the recording codes 33 is to be decreased in advance. Furthermore, since it is conceivable that the length of the recorded pit 35 is changed depending on the recording pattern, a correction to increase the power of the recording pulse 34 may be necessary for a short pattern; or, a control may be required to be effected on the amount of delay to minimize the recording pulse width in some cases. The width of the recording light pulse and the power thereof are set by means of the respective setting units 15–16 under control of a recording corrector 17, thereby causing a laser driver 18 to drive the semiconductor laser 4 so as to form a recorded pit 35. For the encoder, the circuit configuration of the conventional system may be used without modifying the circuit. Concrete configuration examples of the NRZ encoder 14, the pulse width setting unit 15, the power setting unit 16, the recording corrector 17, and the laser driver 18 will be described later in this specification.

Figure 7:
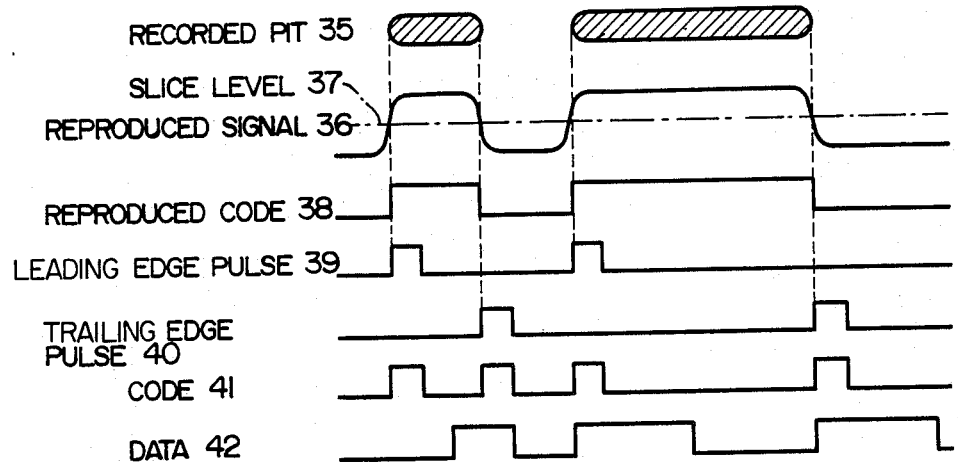
FIG. 7 is a schematic diagram illustrating a data reproducing method.

Referring now to FIG. 7, a description will be given of a case where data 42 is demodulated from the recorded pit 35. The light reflected from the disk 1 changes the quantity of light according to the presence/absence of the recorded pit 35. In a case where the recording film is a magneto-optical recording film and information is recorded in a form of a magnetic domain, when an analyzer is disposed before the photodetector 9, the rotation of the polarization plane corresponding to the direction of magnetization can be converted into a change in the quantity of light, thereby obtaining a similar reproduction signal 36. By classifying the reproduction signal 36 into one of two value ranges by use of a slice level 37 a reproduced code pulse 38 is obtained. From the leading and trailing edges of the reproduced code 38, corresponding pulses 39–40 are generated to attain a code signal 41. This code signal 41 is processed by a decoder effecting an operation opposite to the operation of the encoder 13 so as to reproduce the original data 42. Since the circuit configuration of the prior art technique need only be used for the decoder, the detailed description thereof will be omitted.

Figure 8:
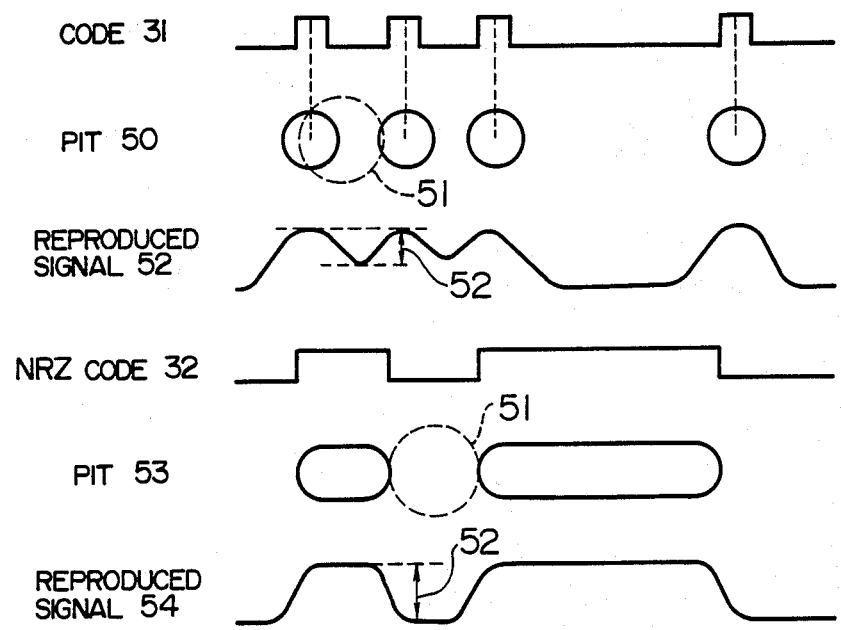
FIG. 8 is a schematic diagram schematically illustrating the comparison between the pit position recording and the pit edge recording.

The pit edge recording method above contributes to the increase of the density of data thus recorded. This is because of the improvement of the relative resolution of the pit formed and the optical spot used to read the pit. FIG. 8 is a schematic diagram showing the comparison between a pit position recording method in which a round hole is formed corresponding to a position of "1" of the encoded codes and the pit edge recording method in which the position of "1" of the encoded codes is associated with the leading edge or the trailing edge of a pit formed. Let us consider a case where a round hole 50 is formed in association with a code 31 in FIG. 8. Since the light spot 51 used to read a recorded pit is distributed in a range greater than the pit, when the distance between recorded pits is small, the amplitude of a reproduced signal 52, namely, the degree of modulation 52 cannot be set to a satisfactory value. This tendency becomes more apparent as the recording density is increased. On the other hand, when the code 31 is once converted into an NRZ code 32, the reproduced signal 54 generated from the pit 53 formed can take a sufficient degree of modulation 52. In the comparison of FIG. 8, the recording density is assumed to be the same both in the pit position recording method and in the pit edge recording method. The recording density of the pit edge recording method can be in principle set to be about twice the recording density of the pit position recording method. In such a case where the double density is implemented by use of the pit edge recording method, even when there does not arise a problem concerning the optical resolution, namely, the degree of signal modulation, since the width of the data discriminating window used to demodulate the reproduction signal into the original data is reduced to be half the width when the density is not increased, it is to be noted that the edge position must be more properly determined. As a consequence, for such data not requiring a high density as information of the signals of the header, the data discrimination window may have a large width so as to use the pit position recording method with the conventional density.

Figure 9:
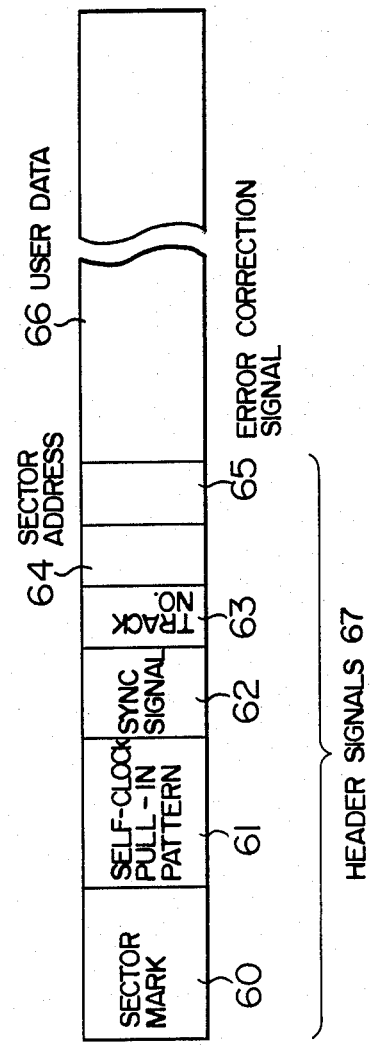
FIG. 9 is a schematic diagram showing an example of a disk format.

Next, a description will be given of a recording format of a disk for use with the present invention. FIG. 9 is a schematic diagram showing an example of a recording format. The configuration of the disk 1 includes tracks in a form of concentric circles or spiral shape in which each track is divided into a plurality of regions (sectors). The diagram of FIG. 9 shows a format of a sector. Each sector begins with a sector mark 60 indicating the beginning of sector and the sector mark 60 is followed by a self-clock pull-in pattern 61 to generate a self-clock. A clock generated from the pattern 61 is synchronized by use of a synchronization signal pattern 62 so as to detect a reference signal for the start of demodulation. Through the operation above, a track address 63, a sector address 64, and an error correction signal to detect/correct a read error of these addresses are reproduced. These data items constitute header signals 67. Since the header signals are not to be changed by the user, it will be convenient to pre-format this portion when the disk is produced. The header and data signals may be recorded in the different modulation methods or by use of different depths of holes, respectively. For example, the header signals may be recorded as phase information with a depth equal to ¼ or ⅛ of the wavelength of the laser light used. Furthermore, the user may record the header signals 67 in the pit position recording method and the user data signals 66 in the pit edge recording method advantageous for a high recording density.

Although the pre-format part is in general formed on guide grooves for the tracking operation, a flat portion between guide grooves may also be used for this purpose. Since the flat portion between guide grooves is less influenced by a fluctuation of the laser light during a cutting operation of the original disk and other processes, the use of the flat portion is effective to minimize the disk noise during the reproduction.

Figure 10:
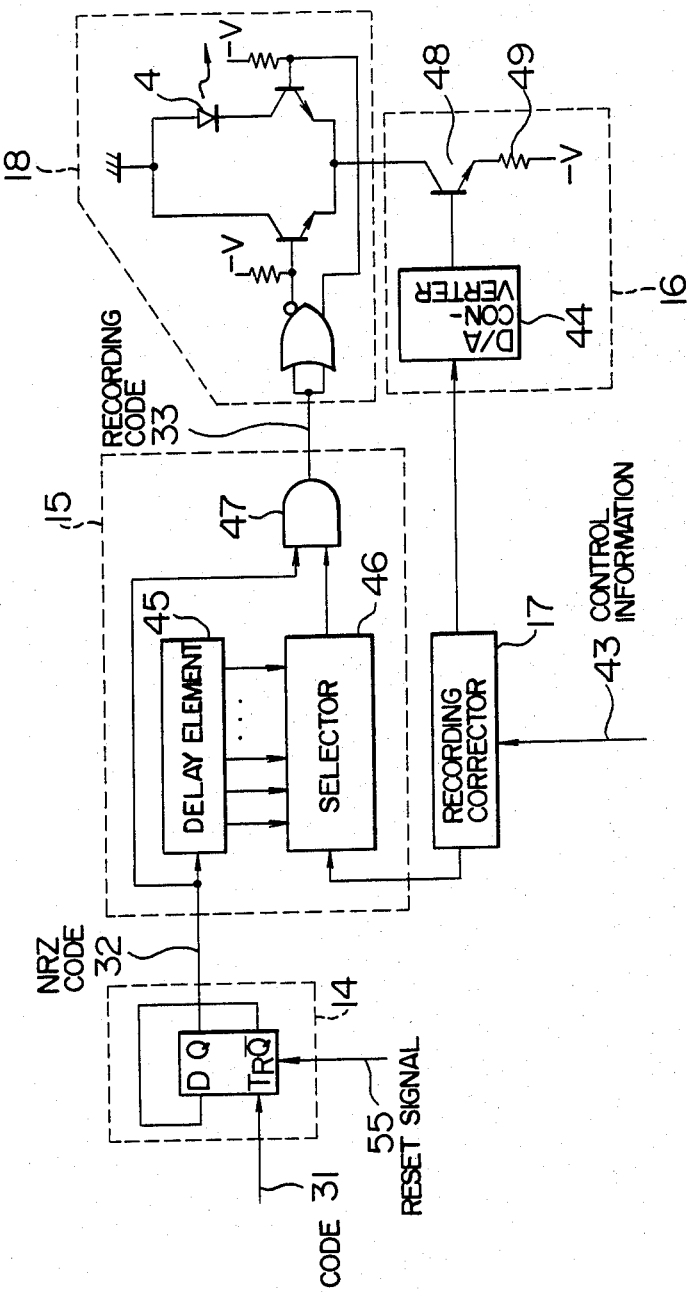
FIG. 10 is a schematic block circuit diagram depicting an example of the configuration of a recording circuit section.

Referring now to FIG. 10, a description will be given of concrete circuit configuration examples of the NRZ encoder 14, the pulse setting unit 15, the power setting unit 16, the recording corrector 17, and the laser driver 18, which has not been described in conjunction with FIG. 7.

In the system of FIG. 10, the NRZ encoder 14 includes a D-type flip-flop. Each time a leading edge of a code 31 is inputted, the flip-flop operates to reverse the Q output. The circuit connection of the flip-flop is generally identical to that used to effect a demultiplication of an input by two. The NRZ code 32 thus converted is supplied to a delay element 45, which delivers having undergone delay of preset periods of time to output taps thereof. There may be applied another method in which a gate delay is used for the delay element 45. The outputs from the delay element 45 are fed to a selector 46 and one of the outputs is selected according to an output from a recording corrector 17 so as to be inputted to an AND gate 47. Since another terminal of the AND gate 47 is supplied with a signal which has not undergone a delay, the width of the pulse generated is decreased by the amount of the delay. The pulse corresponds to the recording code 33 of FIG. 6. The code 33 is fed to the laser driver 18.

On the other hand, the power of the recording light beam is controlled by changing the value of the current source in the laser driver 18, which is configured in a form of a current switch. By changing the potential of the base of a transistor 48 determining the current value by means of a D/A converter 44, the light emitting power to be applied when the semiconductor laser 4 is turned on can be varied. For example, when the potential of the base is set to a high value, the potential of the emitter of the transistor 48 also becomes to be higher and hence the current flowing through a resistor 49 connected between the emitter and a negative potential ($-V$) is increased. Consequently, the drive current driving the semiconductor laser 4 also increases to obtain a higher light emitting power. The recording corrector 17 accordingly sets the pulse width and the power depending on a control information 43. As one of the easiest methods, let us use a read-only memory (ROM) for which the track address is an address input and data from the ROM as an output; then, the selection of the amount of delay by the selector 46 and the specification of input bits to the D/A converter 44 can be effected. Furthermore, in place of the track address signal 43, a value from an external scale reader 11 may be used; or, based on the number of tracks passed from a reference radius (e.g. the inner-most circle) of the disk to the current position, the present location may be recognized to effect the similar control. In the circuit diagram of FIG. 10, at the end of a data area in which information is to be recorded, a reset signal 55 is applied to the flip-flop of the NRZ encoder 14, thereby preventing the recording pulses from being mistakenly irradiated onto the portion of the header of the next sector. In the pit edge recording method, since the recording pulse rises for the first "1" of the data and falls to the original level for the next "1", if there exist an even number of "1's" in the data, the reproduction power is ordinarily restored at the end of the data region; however, for an odd number of "1's", the original reproduction power is not restored after the last data is written. Consequently, since if the recording power is kept the same, data of the subsequent sector is destroyed, it will guarantee safety also to reset the flip-flop immediately when the recording gate signal specifying the data region becomes to be absent. The gate for the specification of the recording data region can be easily implemented by use of a counter to be operated in response to a detection signal of a sector mark disposed at the beginning of each sector.

According to the method above, the recording pulse width and the recording power are varied depending on the recording radius. That is, since the correction value to minimize the recording pulse width and the setting value of the recording power are fixed when the recording radius is determined, this method can be effectively applied to the recording in the linear region 216 of FIG. 2.

However, as described above, when the data pattern interval is minimized as the recording density is increased, the recording characteristic enters the nonlinear region 217 of FIG. 2; consequently, the method above is not capable of effecting a satisfactory recording correction. This situation necessitates to vary the amount of delay to correct tee recording pulse width or the recording power also depending on the degree of density of the data pattern.

To this end, as a first correction method, the recording power is controlled depending on the data pattern, which will be described in conjunction with an embodiment of the present invention.

Figure 11:
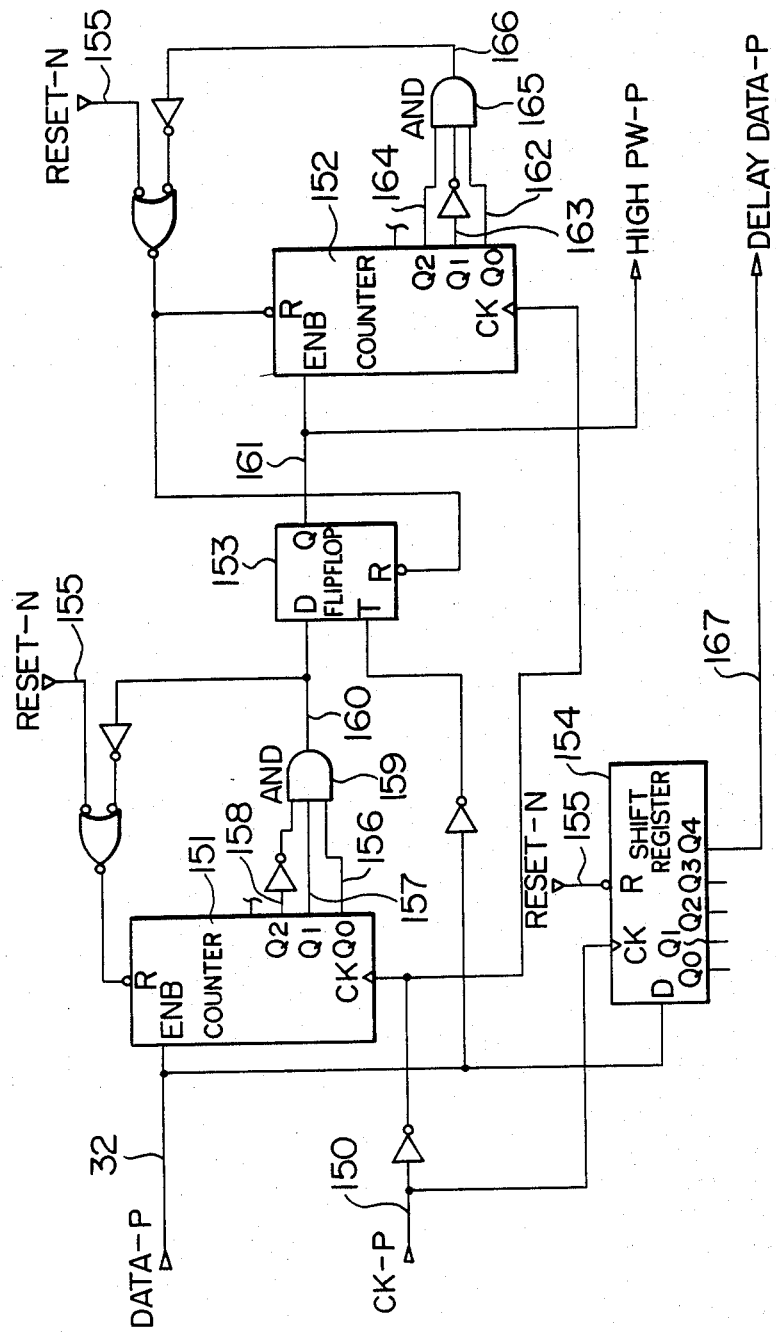
FIG. 11 is a schematic circuit showing a recording data pattern detect circuit.
Figure 12:
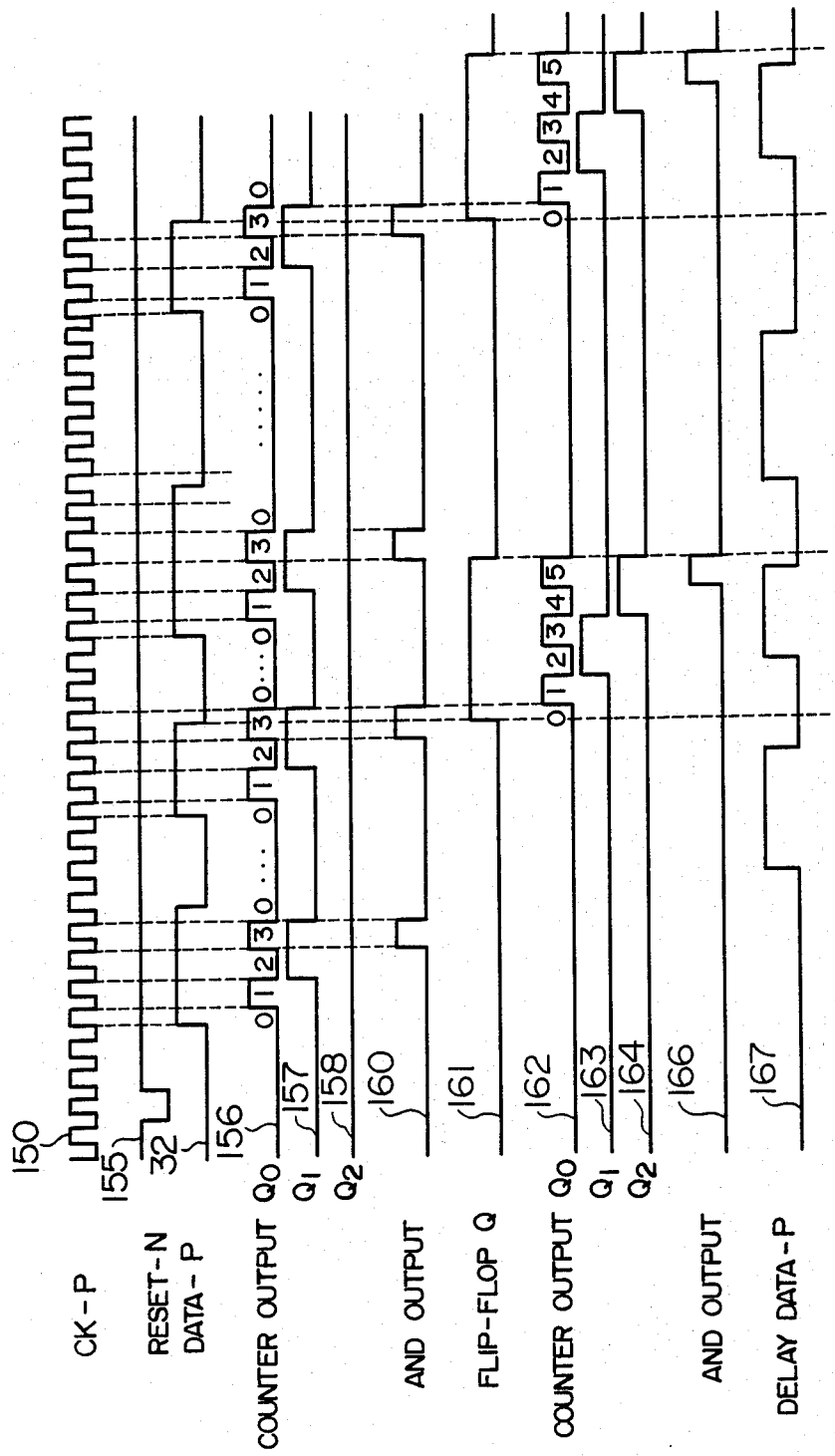
FIG. 12 is a timing chart of signals associated with the recording data pattern detect circuit.

FIG. 11 is a circuit example to record data in which the recording power is increased only for the highest-density pattern, namely, "1001" according to a modulation method to convert the 2-7 codes into the NRZ codes. FIG. 12 shows a timing chart useful to explain the operation of the circuit of FIG. 11. The operation of the circuit will be described with reference to FIGS. 11-12. DATA-P 32 is a data pattern having undergone a modulation and is identical to the NRZ code 32 of FIG. 1. The data 32 is synchronized with a leading edge of the recording clock CK-P 150. Counters 151-152, a flip-flop 153, and a shift register 154 are initially cleared by a reset signal RESET-N 155 at the "L" level before the data 32 is transferred. The counter 151 has an enable (ENB) terminal connected to the DATA-P so that the count-up operation is enabled only when the data 32 is at the "H" level. When the counter 151 is enabled, outputs $Q_0$ 156, $Q_1$ 157, and $Q_2$ 158 from the counter 151 change as shown in FIG. 12, where $Q_0$, $Q_1$, and $Q_2$ mean outputs of $2^0$, $2^1$, and $2^2$, respectively. The AND gate 159 delivers an output 160 which is set to "H" only when the count value is in the interval of 3. Incidentally, the counter 151 is so connected to change the output therefrom at a following edge of the clock 150. The output 160 from the AND gate 159 is connected to a reset terminal of the counter 151 and a data (D) terminal of the flip-flop 153 so as to reset the counter 151 when the output 160 is set to "H". When the data 32 includes the highest-density pattern "1001", since the leading edge of the data 32 exists in the interval where the AND output 160 is "H", the Q output 161 of the flip-flop 153 is set to "H". The Q output 161 is connected to the enable (ENB) terminal of the counter 152. Consequently, when the Q output 161 is set to "H", the counter 152 initiates the count-up operation and then the $Q_0$ 162, $Q_1$ 163, and $Q_2$ 164 of the counter 152 change as shown in FIG. 12. The output 166 from the AND gate 165 is set to "H" only in the interval where the count value is five, which resets the flip-flop 153 and the counter 152. As a consequence, the output 161 from the flip-flop 153 is at the "H" level only in the interval where the counter 152 is counting from 0 to 5. The Q output 161 is an instruction signal (detection signal of the highest-density pattern) to increase the recording power.

In practice, however, the detection signal 161 of the highest-density pattern is generated after the generation of the highest-density data pattern and hence the shift register 154 is used to delay the data 32 so that the highest-density data pattern is located in the interval where the signal 161 is at the "H" level. The relationships with respect to time between the delayed data 167 and the highest-density pattern detection signal 161 are as shown in FIG. 12. The signal 161 is used to change over data to be supplied to the D/A converter 44 of FIG. 10 and the delayed data 167 is applied in place of the signal 33 of FIG. 10, thereby achieving the object described at the beginning of the specification. Although the recording power is corrected only for the highest-density pattern "1001" in the circuit example above, in a case where the recording power is also corrected for a data pattern "10001" which is of the second highest density, a circuit which is so connected that the output 160 from the AND gate 159 is set to the "H" level when the output from the counter 151 is four and that the output 166 from the AND gate 165 is set to the "H" level when the output from the counter 152 is six need only be added to the circuit configuration of FIG. 11.

The effect of the first recording correction has been described. As shown in (b) of FIG. 17, for the amount of deviation of the recording timing, there remains a difference between the fixed deviation 221 in the linear region and the deviation 224 in the nonlinear region after the correction, namely, there may exist a case where the recording timing deviation cannot be completely corrected.

To remove this troublesome phenomenon, there is applied a method to control the amount of delay so as to decrease the recording pulse width depending on the data pattern, which will be described herebelow.

Figure 13:
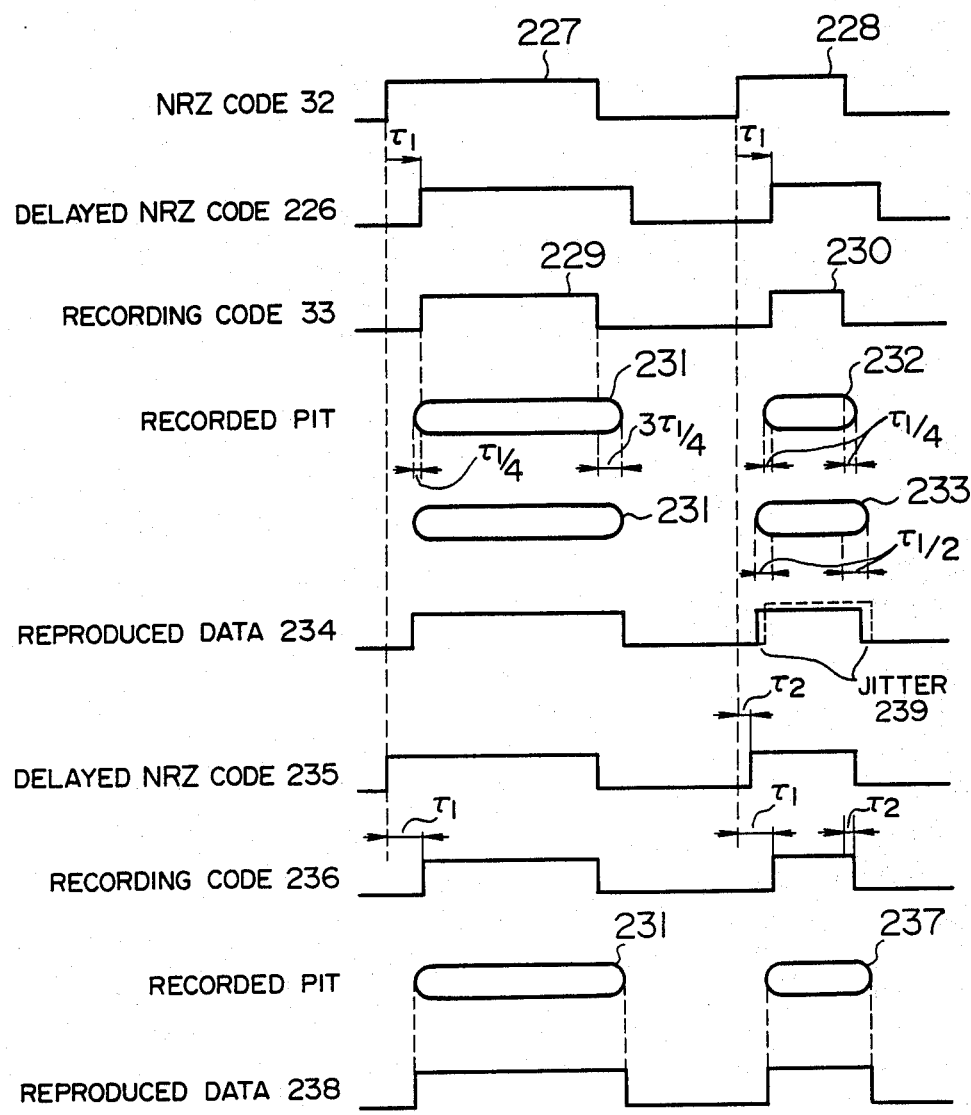
FIG. 13 is a schematic diagram illustrating another example of the data recording method.
Figure 14:
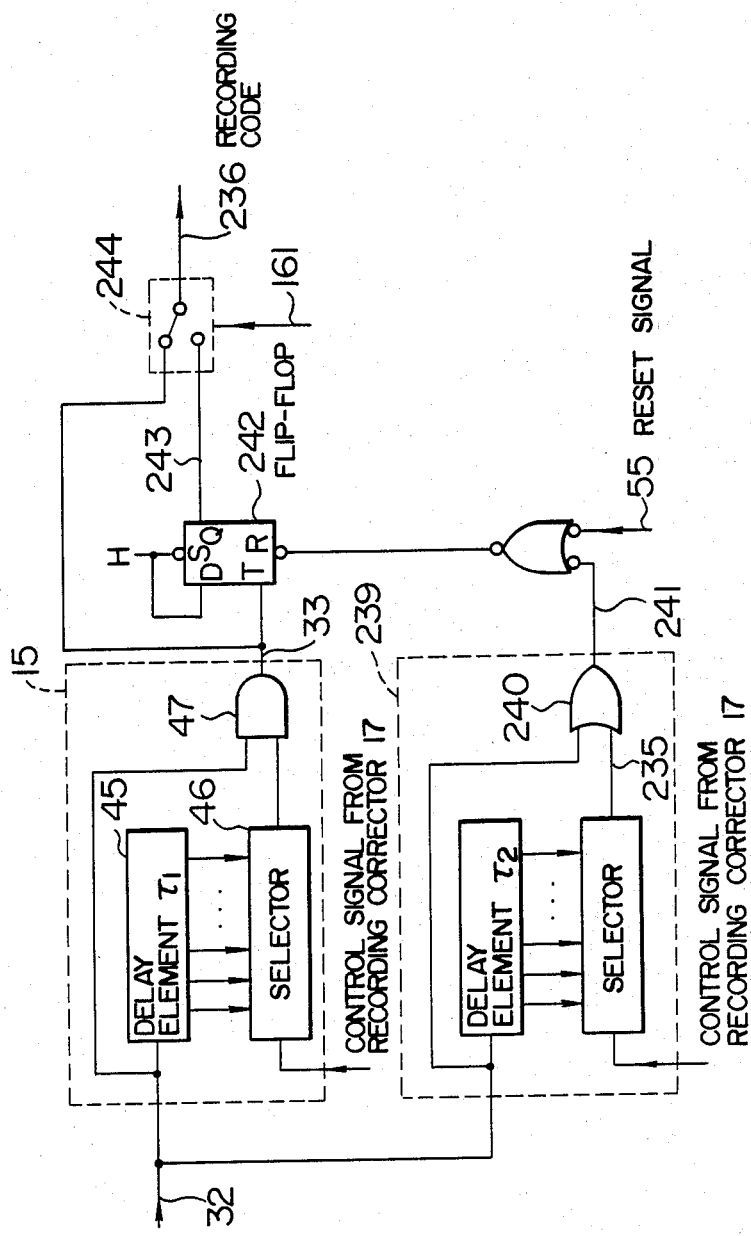
FIG. 14 is a schematic diagram illustrating the configuration of the recording circuit section associated with the data recording method of FIG. 13.

Referring now to FIG. 13, the second recording correction method will be described in comparison with the first recording correction method. Let us consider a case in which the NRZ code 32 converted from the 2-7 code is recorded. More concretely, as shown in FIG. 13, there are recorded a data pattern 227 having a wide pattern interval and corresponding to the recording characteristic of the linear region 216 and a highest-density pattern 228 having a short pattern interval and corresponding to the recording characteristic of the nonlinear region 217. In this description, the recording code 33 is attained as a logical product between the NRZ code 32 and a delayed NRZ code 226 having a fixed delay $\tau_1$ with respect to the NRZ code 32. The recording code 33 is recorded with a fixed recording power. Assume the pits 231-232 are formed by recording pulses 229-230 associated with the data patterns 227-228, respectively. For the pit 231 corresponding to the data pattern 227 belonging to the linear region, the expansion and the recording timing deviation are fixed as described above, for example, for the recording pulse 229, a pit is assumed to be recorded with an elongation of $\tau_1/4$ on the leading edge side and an elongation of 3 $\tau_1/4$ on the trailing edge side. On the other hand, in comparison with the pit 231 corresponding to the linear region, the pit 232 associated with the highest-density pattern 228 belonging to the nonlinear region is formed with the similar elongation or the leading edge side thereof and with a decreased elongation on the trailing edge side; consequently, the recording timing deviation hardly takes place like the deviation 233 shown in (b) of FIG. 3. As an example, assuming the expansion on the leading edge side to be $\tau_1/4$ and that on the trailing edge side to be $\tau_1/4$. In the first recording correction method, the recording power was set to a large value for the highest-density pattern 228. The pit 233 formed in this case is, as already described in conjunction with (b) of FIG. 3, attended with a slight deviation 224 on the trailing edge side, which is still less than the deviation 221 in the linear region. Assume here that due to an increase of the recording power, a pit 233 is formed with an expansion of $\tau_1/2$ on the leading edge side as well as on the trailing edge side. As described above, the reproduced data 234 detected from the pits 231 and 233 recorded according to the first recording correction method are attended with a difference in the recording timing deviation of $\tau_1/4$ and hence the jitter 239 is kept remained. To solve this problem, according to the second recording correction method, there are provided concrete means to control the amount of delay so as to establish an agreement of the recording timing deviation; more concretely, delay values are separately prepared to determine the leading edge side and the trailing edge side of the recording pulse, respectively. For the amount of delay $\tau_1$ determining the leading edge side, since the expansion on the leading edge side is of the similar degree in the linear region and the nonlinear region, the delayed NRZ code 226 is directly used. On the other hand, for the amount of the delay $\tau_2$ determining the trailing edge side, the value is set to zero for the data pattern 227 belonging to the linear region. For the data pattern 228 belonging to the nonlinear region, based on the recording characteristic of (a) of FIG. 2, a condition is attained to generate a pit from which a data pattern interval identical to the data pattern interval of the data pattern 228 can be reproduced by irradiating a recording pulse for which the time difference $(\tau_1 - \tau_2)$ is subtracted from the pattern interval, thereby setting the delay $\tau_2$. That is, the amount of delay $\tau_2$ is varied depending on the data pattern. Using a recording code 236 for which the leading-edge and the trailing edge of the recording pulse are respectively determined by the delayed NRZ code 226 with the delay $\tau_1$ and the delayed NRZ code 235 with the delay $\tau_2$ of the NRZ code, pits 231 and 237 having the same recording timing deviation can be formed by the data patterns 227–228, respectively, which enables to reproduce the reproduction data 238 identical to the NRZ code 32. Referring now to FIG. 14, a description will be given of a circuit configuration effecting the second recording correction method described above. In this configuration, means to set a preset delay $\tau_1$ for a data pattern so as to attain a recording code 33 is identical to the pulse setting unit 15 of FIG. 10. On the other hand, a pulse width setting unit 239 is additionally disposed to set an amount of delay $\tau_2$ only for the highest-density pattern. In response to a control signal from the recording correction unit 17, the pulse width setting circuit 239 sets the delay $\tau_2$ obtained from the recording characteristic of (a) of FIG. 12 and delivers the resultant delayed NRZ code 235 with the delay $\tau_2$ and the NRZ code 32 to an OR gate 240, which in turn outputs a series of pulses 241 obtained by expanding the pulses of the NRZ code 32 by the delay $\tau_2$ on the trailing edge side thereof. Next, the recording code 33 and the pulse series 241 are inputted to a trigger terminal T and a reset terminal R of a flip-flop 242, respectively. The flip-flop 242 has a function that with the reset terminal R set to a state of "H", the output Q is set to "H" at a timing of the leading edge of an input pulse to the trigger terminal T. Furthermore, when the input in the reset terminal is set to "L", the output Q is set to "L" regardless of the input to the trigger terminal T. Consequently, this circuit outputs a series of pulses 243 comprising pulses generated at the leading edge of the recording code 33 and at the trailing edge of the pulse series 241. The pulse series 243 is then supplied to a change-over circuit 244. The change-over circuit 244 effects a change-over operation depending on a pattern detection signal 161 such that the pulse series 243 is outputted only when the highest-density pattern is detected and the recording code 33 is delivered for other patterns. As a result, a recording code 236 appears at the output. In the circuit example above, although the amount of delay $\tau_2$ is set only for the highest-density data pattern "1001", a pulse width setting circuit may be disposed for a plurality of data patterns belonging to the nonlinear region so as to operate the change-over circuit 244 depending on a detected data pattern. Moreover, it is also possible to combine the first recording correction means and the second recording correction means.

Next, a description will be given of a processing to decode data 42 from a recorded pit 35, namely, an example of a concrete configuration of the reproduction corrector 20. FIG. 15 is a schematic diagram showing a configuration example of the reproduction corrector 20. Data converted into electric signals through the photodetector 9 is amplified by an amplifier 19 to a desired level. According to the present invention, as shown in FIGS. 6–7, the recording signals are recorded on a disk in a form of variable-length pits corresponding to information to be recorded and the leading edge and the trailing edge of each pit are dealt with as data. Signals delivered from the amplifier 19 are classified into two value ranges by means of a comparator 70 of a differential output type. The threshold value used for the binary value generation is supplied to a reverse input side of the comparator 70. The differential outputs are delivered through two paths including a path directly connected to the AND gates 71–72 and a path connected thereto via a delay element 73 and a delay element 74, respectively. Consequently, an output from the AND gate 71 represents a leading edge detection pulse 39 and an output from the AND gate 71 is a trailing edge detection pulse 40. In the circuit example of FIG. 15, although a comparator of the differential output type is used, the comparator may be of a single output type, namely, of a single-stage configuration. In this case, an inverter with respect to the logic may be disposed so as to use the same circuit configuration. The leading edge detection pulse 39 and the trailing edge detection pulse 40 are respectively fed to variable frequency oscillators (VFO's) 75–76 for generating and synchronizing the self-clock. Outputs from the VFO's 75–76 are delivered to data demodulation start pattern detect circuits (generally referred to as SYNC detect circuits) 77–78, respectively. The pattern agreement signals 79–80 respectively detected by the SYNC detect circuits 77–78, the leading edge detection signal 39, and the trailing edge detection signal 40 are supplied to a circuit (correction circuit) 81 effecting a correction with respect to time. A concrete configuration example of the correction circuit 81 will be described later. An output from the correction circuit 81 is fed to a decoder 82, which in turn decodes the data. The circuit and method of the decoding may be the same as for the conventional system.

A description will now be given of a demodulation start pattern used in the present invention. The data demodulation start pattern is recorded at the beginning respectively of the synchronization signal 62 and the user data 66 in FIG. 9. The data modulation start patterns are provided to appropriately supply a demodulation or decoding timing. In general, in order to detect the pattern, data in shift registers are shifted by use of a clock generated by a VFO so as to AND small blocks (e.g. 4-bit blocks) of the register outputs, and a majority decision is effected with the outputs from the AND gates.

Figure 16:
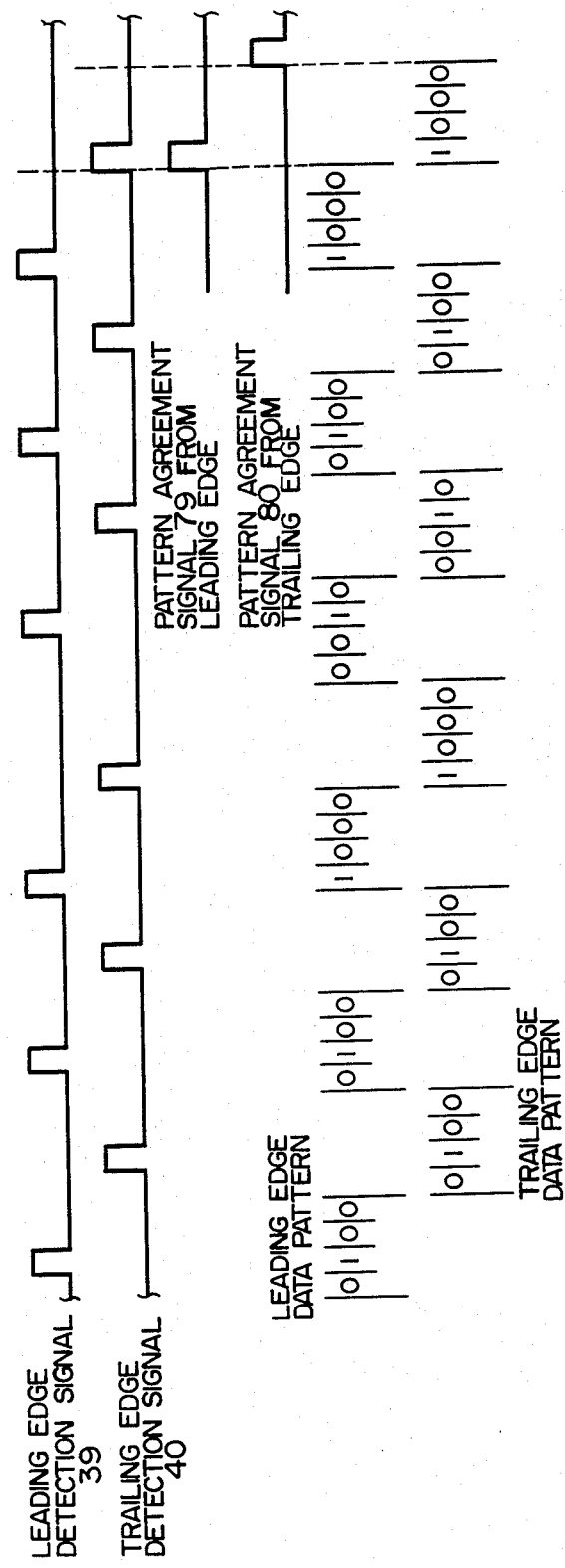
FIG. 16 is a schematic diagram illustrating a duplicated synchronization data pattern.

FIG. 16 shows an example of duplicated timing mark patterns. When the leading edge detection signal 39 and the trailing edge detection signal 40 are supplied to separate pattern distinction circuits, the agreement signal 79 from the leading edge and the agreement signal 80 from the trailing edge are generated at positions shown in FIG. 16. In the example of FIG. 16, the time difference between these agreement signals 79–80 is equivalent to four bits if the edge detection is appropriately effected.

Figure 17:
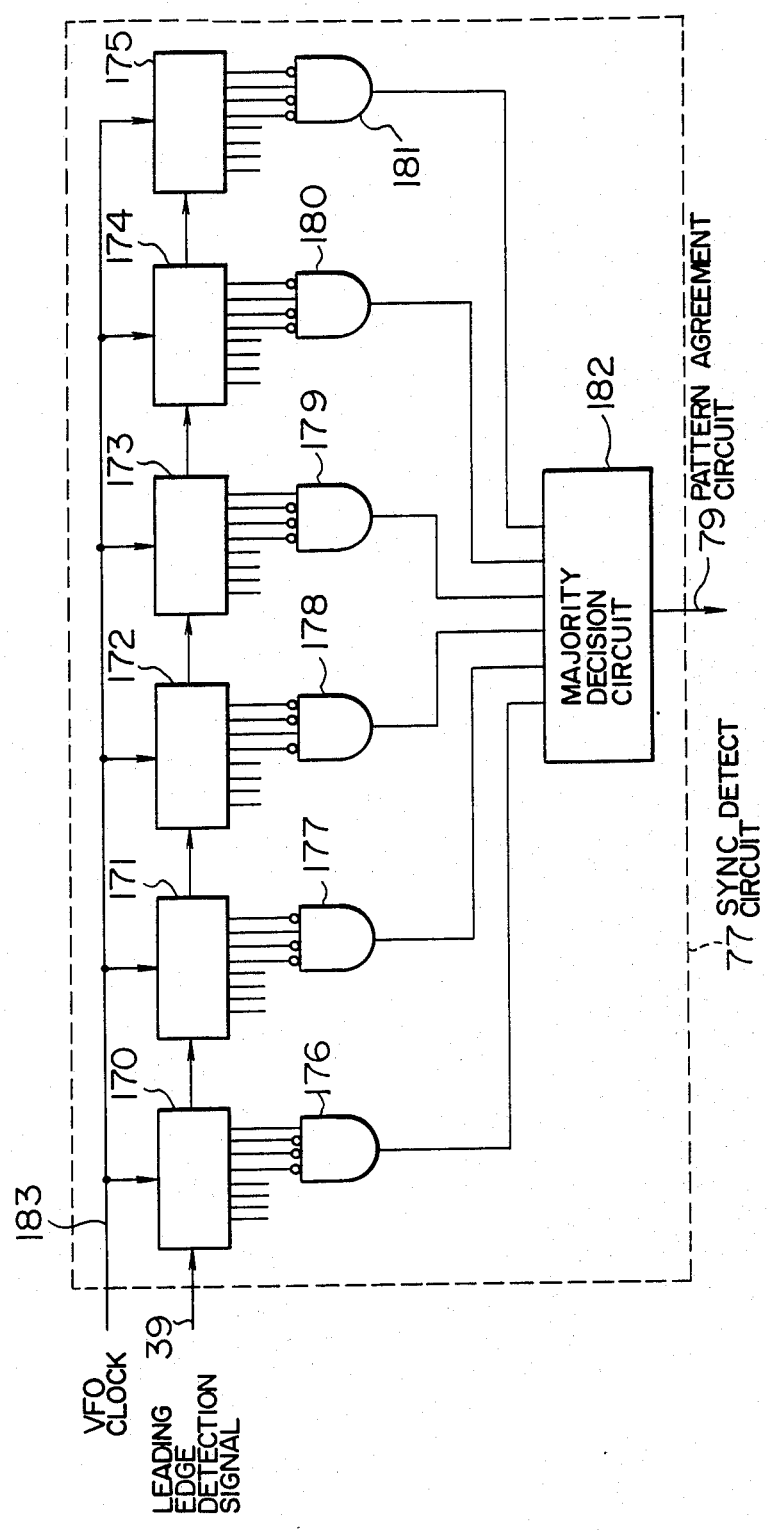
FIG. 17 is a schematic diagram showing a pattern detect circuit.

FIG. 17 shows an example of a circuit to detect a timing mark pattern from the leading edge. Using 8-bit shift register 170-175, a logical product is calculated for the respective small blocks so as to attain the detection signal from the majority decision circuit 182. The majority decision circuit 182 may be configured with gates or may include an ROM so as to use as addresses thereof the outputs from the respective AND gates 176 181, thereby obtaining the output data from the ROM as the detection signal 79.

In the description above, a recording pit is formed at a proper position only through a correction during the recording as shown in FIG. 6, namely description has been given of an ideal case for reproducing a position of "1" during the recording operation. Actually, however, since the position of "1" during the recording operation cannot be correctly reproduced only by the recording correction in some cases, the width of the information discriminating window becomes to be very small and an error possibly takes place if a demodulation is directly effected. To overcome this difficulty, the demodulation start timing pattern disposed in the duplicated form is effectively used to automatically correct a variation in the position of an edge of a user data series following the demodulation start timing pattern, which will be described herebelow.

Figure 18:
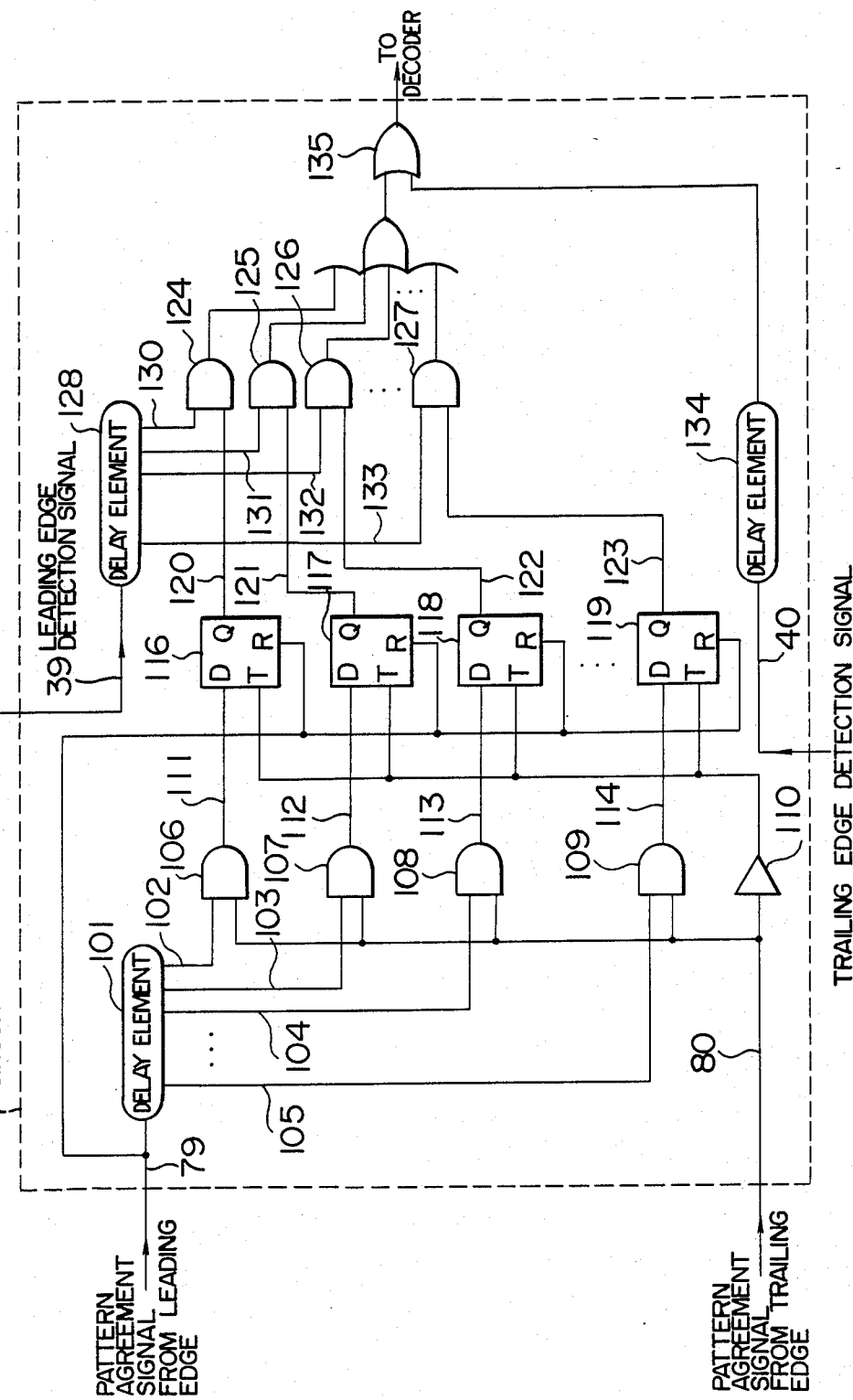
FIG. 18 is a schematic diagram illustrating a time-axis correction circuit.
Figure 19:
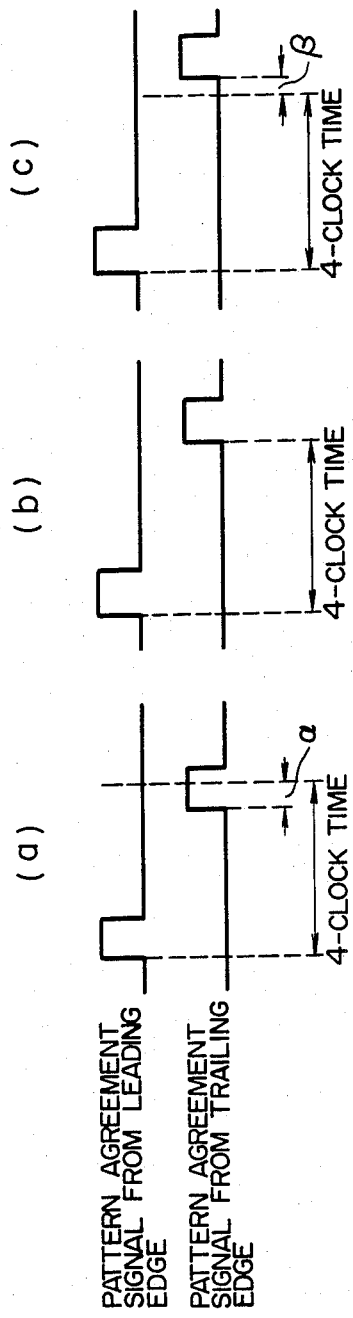
FIGS. 19 (a-c) and 20 are timing charts associated with the time-axis correction circuit.
Figure 20:
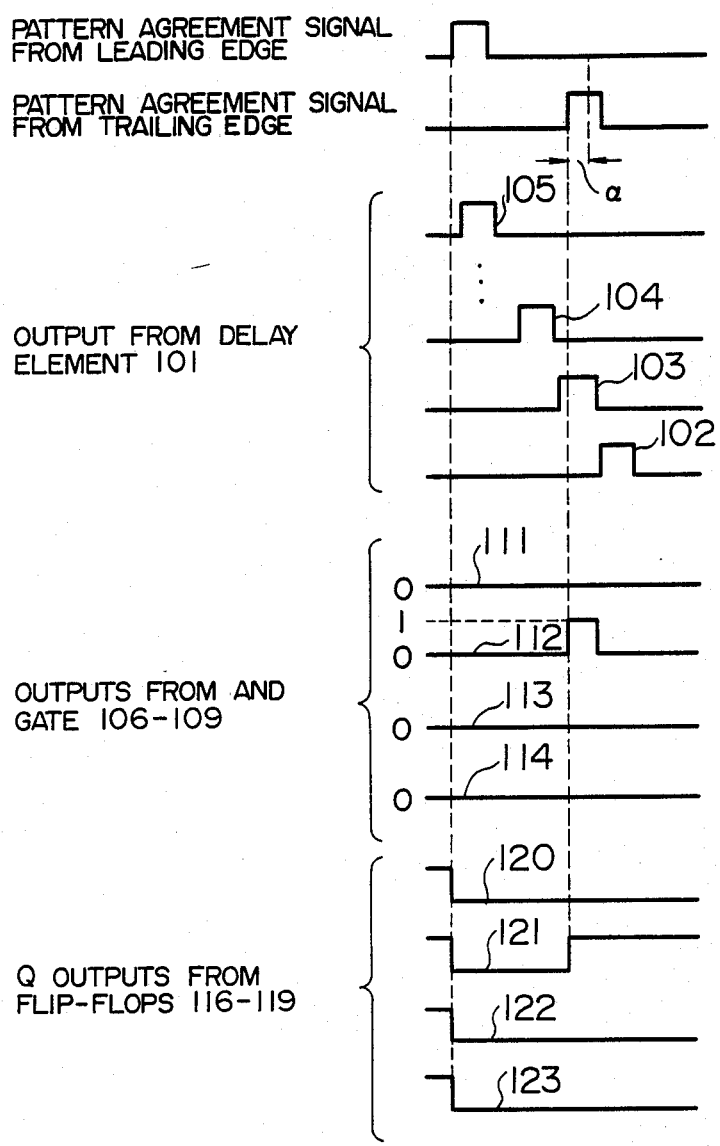

FIG. 18 is a schematic diagram showing a configuration example of the correcting circuit 81 of FIG. 15. The pattern agreement signal 79 from the leading edge is supplied to a delay element 101 delivering a plurality of delayed outputs. The outputs 102-105 are delivered to AND gates 106-109, respectively. In the other hand, the pattern agreement signal 80 from the trailing edge is supplied to a buffer circuit 110 having an amount of delay equal to a delay amount of one of the AND gates 106-109 and to AND gates 106-109. The outputs 111-114 from the AND gates 106-109 are delivered to data (D) terminals of flip-flops 116-119, respectively. A trigger (T) terminal of each of the flip-flops 116-119 is supplied with an output 115 from the buffer 110. Referring now to FIGS. 19-120, the operation of the circuit of FIG. 18 will be described. FIG. 19 shows the generation timing of the pattern agreement signal 79 from the leading edge and that of the pattern agreement signal 80 from the trailing edge. In FIG. 19, a case where an agreement signal 80 is generated with a delay shorter by α than the normal delay 4T, namely, 4-bit clock delay, a case where an agreement signal 80 is generated with the normal delay, and a case where an agreement signal 80 is generated with a delay longer by 8 than the normal delay are shown in (a), (b), and (c), respectively. If the situation is always as shown in (b) of FIG. 19, the time-axis correction need not be effected at all to use the logical sum (OR'ed result) of the leading edge detection signal 39 and the trailing edge detection signal 40 as the code series 41; however, in the case of (a) or (c) of FIG. 19, it is necessary to effect a time correction equivalent to α or β before the logical sum is calculated to generate the code series 41. FIG. 20 shows the operation of the circuit of FIG. 18 in the case of (a) of FIG. 19. The delayed outputs 102-105 are delayed with an equal amount of delay therebetween. Consequently, in the case of FIG. 19, the delayed output 103 can be used as a delayed output to be ANDed with the agreement signal 80 from the trailing edge. As a result, only the output 112 from the AND gate 107 is "H" during the agreement time so as to set the Q output from the flip-flop 117 to "H". Namely, in the circuit of FIG. 18, only the AND gate 125 is opened among the AND gates 124-127. On the other hand, the leading edge detection signal 39 is fed to the delay element 128 and only the delayed output 131 selected from the delayed outputs 130-133 is passed to the AND gate 125. If the delayed output 131 is delayed by a period of time equivalent to o of FIG. 6, a correction of the error o can be effected for the user data series 66 following the agreement signals 79-80. In FIG. 12, the trailing edge detection signal 40 is also passed through the delay element 134. This is because about half the maximum delay time of the delay element 128 is provided for the trailing edge detection signal 40 so as to effect the correction thereof at a point further advanced in time. After the correcting operation is thus completed, a logical sum of the leading edge detection signal 39 and the trailing edge detection signal 40 are obtained by an OR gate 135, which generates a sequence of data series. Incidentally, without calculating the logical sum, the leading edge detection signal 39 and the trailing edge detection signal 40 may be supplied to separate data demodulation circuits to achieve the object processing.

A description has been given of the operations of the respective components of the optical system and recording/reproduction signal processing system constituting the optical disk recording/reproduction apparatus of FIG. 5. Next, operations for actually recording and reproducing data on and from the disk 1 will be described according to the operation sequence.

The disk 1 is ordinarily housed in a cartridge so as to be mounted on a spindle of the motor 2 or on a spindle in a magnet chuck system having such an automatic spindle adjusting mechanism as that used in a compact disk. Moreover of the optical head 3 is conducted by a linear motor. After the disk 1 is mounted on the spindle, the motor 2 starts rotating. When the motor rotation speed reaches a stationary state or a fixed value, a rotation OK signal is sent to the controller so as to turn the semiconductor laser 4 on and to apply the reproduction power onto the recording film of the disk 1. The auto focus servo is activated thereafter and then the tracking servo is started to follow guide grooves formed in the disk 1, which enables to read information from the header portion preformatted on the disk 1. Through the sequence above, the recording/reproduction control section 12 can recognize the track address and the sector address where the light beam spot is currently located. The positioning of the optical head to a track for the recording operation can be achieved by the prior art method. That is, based on an external scale 11 or the count of the zero-crossing points of the signal obtained when the optical head passes a track, a rough positioning of the optical head is achieved to confirm the track address and then the optical head is moved over several tracks by means of the galvano mirror 7. After the optical head s located at an object track, the recording data is recorded in the track. The recording pulse width and the recording power are set depending on a track number or an external scale value and by use of the power setting circuit (FIG. 11) according to the recording pattern. Specification of a recording area in an object sector is effected by generating a recording gate through a clock pulse count control based on the detection pulse of the sector mark 60 or the synchronization signal 62 in the header signal field 62. When recording pulses are irradiated on the disk 1, the gain of the auto focus servo and the tracking servo is increased; consequently, for a stable tracking operation, there has been used a method in which the gain is lowered during the recording operation. In the case of the pit edge recording, since the recording power on average is increased as compared with the case of the pit position recording, the reduction of the gain must be emphasized. The actual values must be set in consideration of various conditions such as the modulation method and the recording power.

Also for the reproducing operation, the movement and positioning of the beam spot is achieved through the similar sequence to that of the recording operation. Variation in the position of the data edge during the reproduction is reduced by the corrector 20 to achieve a stable data demodulation.

In the apparatus and method of pit edge recording and reproduction described above according to the present invention, a write-once type disk is used as a recording medium; however, the same operation can be achieved by use of another type of optical disk medium (such as a magneto-optical disk or a phase-transition type disk). Particularly, in a case of a magneto-optical disk, the strength of an external magnetic field applied for the recording and the reproduction can also be controlled, like the recording pulse width and the recording power, depending on the recording position and the recording pattern.

According to the present invention, in the method and apparatus of data recording and reproduction in which the leading edge and the trailing edge of the reproduced waveform are dealt with as data, the recording pulse width and the recording power are set in consideration of the recording position and recording pattern on a disk, the recording sensitivity of the disk, and the like, thereby achieving the pit edge recording. During the reproduction, the duplicated synchronization signals are used to correct the amount of variation in the edge position of the user data. Through the corrections during the recording and the reproduction, influence from the variation in the characteristic of the recording film is minimized, which leads to an effect that a highly reliable data recording and reproduction can be conducted with a reduced edge shift.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

We claim:

1. An information recording and reproducing method of a pit-shape forming optical recording type comprising the steps of:

modulating an intensity of a laser light by a recording pulse corresponding to an input modulation signal representative of a data pattern to be recorded on a recording medium;

irradiating the modulated laser light onto the recording medium;

forming a local recording region of a pit-shape by movement of the laser light on the recording medium; and recording and reproducing information utilizing a leading edge and a trailing edge of the recording region as data;

wherein a pulse width of the recording pulse of the input modulation signal representative of the data pattern to be recorded on the recording medium is reduced by a fixed value in accordance with a line speed of the laser light on the recording medium so as to set a movement distance of the laser light on the recording medium shorter by a fixed value than a length of the recording region corresponding to the data pattern to be formed on the recording medium originally; and when the movement distance of the laser light on the recording medium and the length of the recording region formed by the movement of the laser light are in a non-linear relationship, increasing an output of the laser light and/or decreasing a reduction value of the pulse width.

2. A method according to claim 1, wherein during a reproducing operation, signals respectively associated with the leading edge and the trailing edge are detected independently so as to correct a time interval between both signals.

3. A method according to claim 2, further comprising increasing the output of the laser light when the input modulation signal is a highest-density pattern.

4. A method according to claim 2, further comprising detecting the line speed of the laser light on said recording medium utilizing a track number written in a header region.

5. A method according to claim 1, wherein the recording medium includes a header signal portion having information preformatted in advance thereon, the header signal portion including a synchronization signal, a track address, a sector address and an error correction code.

6. A method according to claim 1, wherein the recording pulse is controlled by use of a signal from an external scale disposed to detect a position of an optical recording/reproducing head.

7. A method according to claim 5, where the header signal portion recorded on the recording medium in advance is recorded in a different form than that of data signals forming a local recording region of a pit-shape.

8. A method according to claim 5, wherein the header signal portion is formed by use of a pit position recording method.

9. A method according to claim 2, wherein as synchronization signals to effect a time-access correction of a data series during a reproducing operation, demodulation start synchronization signals are independently provided in a duplicated configuration in a leading edge and a trailing edge of the recording region.

10. An information recording and reproducing method of a pit-shape forming optical recording type, wherein an intensity of a laser light is modulated to a high level/low level by a rectangular recording pulse in accordance with a data pulse representative of a data pattern to be recorded on a recording medium, the recording medium is scanned by the modulated laser light, a local recording region corresponding to the recording pulse is formed by the laser light of the high level intensity, and recording and reproduction are performed utilizing a leading edge and a trailing edge of the recording region as data, the method comprising the steps of:

reducing a pulse width of the data pulse in accordance with a line speed of the laser light on the recording medium;

modulating the intensity of the laser light to the high level/low level by use of the data pulse having the reduced pulse width as the recording pulse;

scanning the laser light of the high level intensity only on the recording medium over a range narrower than the local recording region to be recorded on the recording medium in accordance with the data pulse; and increasing a height of the recording pulse and/or reducing a value of the pulse width when the scanning range of the laser light is too short to cause the scanning range of the laser light on the recording medium and a width of the recording region formed by the scanning of the laser light to be in a non-linear relationship.

11. A method according to claim 10, wherein the recording pulse is obtained by reducing the pulse width of the data pulse by calculating a logical product of the data pulse and a pulse obtained by delaying the data pulse.

12. A method according to claim 10, wherein the pulse height of the recording pulse is increased only when the recording pulse is a highest-density recording pattern.

13. An information recording and reproducing method of a pit-shape forming optical recording type, wherein an intensity of a laser light is modulated by a recording pulse corresponding to an input modulation signal representative of a data pattern to be recorded on a recording medium, the modulated laser light is irradiated on the recording medium, a local recording region is formed by a movement of the laser light on the recording medium, and a reproducing pulse is obtained from reflected light by irradiating a light beam on the recorded region, the method comprising the steps of:

(1) using as the recording pulse, a pulse obtained by reducing a pulse width of the input modulation signal by a fixed value in accordance with a moving speed of the laser light on the recording medium when a movement distance of the laser light on the recording medium and a length of the recording region formed as a result of the movement are in a linear relationship, and (2) controlling of the pulse width of the input modulation signal and/or the intensity of the laser light to maintain the movement distance of the laser light on the recording medium and the length of the recorded region formed as a result of the movement in a linear relationship when the movement distance of the laser light on the recording medium and the length of the local recording region formed as a result of the movement are in a non-linear relationship.

14. An information recording and reproducing apparatus of a pit-shape forming optical recording type comprising:

head means for at least one of irradiating a laser light corresponding to a data pattern to be recorded on a disk-shaped recording medium to form a recording region corresponding to the data pattern and for irradiating a laser light to obtain a reproduced waveform corresponding to the recording region from the recording medium;

converting means for reducing a pulse width of an input modulation signal representative of the data pattern to be recorded;

means for irradiating the laser light only on the recording medium over a range narrower than the recording region corresponding to the data pattern to be recorded, by modulating an intensity of the laser light by the input modulating signal converted by the converting means; and means for increasing an output of the laser light and/or reducing a reduction value of the pulse width when a movement distance of the laser light on said recording medium and a length of the recording region formed by a movement of the laser light are in a non-linear relationship so as to make the relationship between the movement distance of the laser light on the recording medium and the length of the recording region formed by the movement of the laser light linear.

15. An apparatus according to claim 14, further comprising control means for controlling one of a pulse height and pulse width of the recording pulse in accordance with a recording radius of the recording medium having a disk shape.

16. An apparatus according to claim 14, further comprising control means for controlling at least one of a power and a pulse width of the recording pulse in accordance with a degree of a density of a pattern of information to be recorded.

17. An apparatus according to claim 14, further comprising self-clock generate means and data demodulation start position generate means.

18. An apparatus according to claim 14, further comprising means for generating a self-clock from a reproduced signal associated with the leading edge and separate and independent means for generating a self-clock from a reproduced signal associated with the trailing edge.

* * * * *